US012377022B2

(12) United States Patent
Fangrow

(10) Patent No.: US 12,377,022 B2
(45) Date of Patent: Aug. 5, 2025

(54) PRESSURE-REGULATING VIAL ADAPTORS

(71) Applicant: ICU MEDICAL, INC., San Clemente, CA (US)

(72) Inventor: Thomas F. Fangrow, Mission Viejo, CA (US)

(73) Assignee: ICU Medical, Inc., San Clemente, CA (US)

( * ) Notice: Subject to any disclaimer, the term of this patent is extended or adjusted under 35 U.S.C. 154(b) by 1118 days.

(21) Appl. No.: 17/228,990

(22) Filed: Apr. 13, 2021

(65) Prior Publication Data

US 2021/0228444 A1 Jul. 29, 2021

Related U.S. Application Data

(63) Continuation of application No. 16/223,499, filed on Dec. 18, 2018, now Pat. No. 10,987,277, which is a (Continued)

(51) Int. Cl.

*A61J 1/20* (2006.01)
*A61J 1/14* (2023.01)

(52) U.S. Cl.

CPC ........... *A61J 1/2086* (2015.05); *A61J 1/1406* (2013.01); *A61J 1/1456* (2015.05); *A61J 1/201* (2015.05);

(Continued)

(58) Field of Classification Search

CPC .. A61J 1/20; A61J 1/201; A61J 1/2086; A61J 1/1456; A61J 1/2037; A61J 1/2055;

(Continued)

(56) References Cited

U.S. PATENT DOCUMENTS 2,074,223 A 3/1937 Horiuchi et al.
2,409,734 A 10/1946 Bucher et al.

(Continued)

FOREIGN PATENT DOCUMENTS

AU 2013200393 A1 2/2013
CA 1037428 8/1978

(Continued)

OTHER PUBLICATIONS

European Opposition, re EP Application No. 12823375.6, dated Jul. 24, 2023.

(Continued)

*Primary Examiner* — Philip R Wiest

(74) *Attorney, Agent, or Firm* — Knobbe, Martens, Olson & Bear, LLP

(57) ABSTRACT

According to some embodiments of the present disclosure, an adaptor configured to couple with a sealed vial can include a connector interface. The adaptor can include one or more access channels (e.g., passages). In some cases the one or more access channels are in fluid communication with the connector interface. The adaptor can include a piercing member. The piercing member can include a regulator channel. The adaptor can include a regulator assembly. The regulator assembly can include a first regulator inlet. In some cases, the regulator includes a second regulator inlet. One or more of the first and second regulator inlets can include a filter configured to filter fluid passing into and/or out of the respective regulator inlets. One or more valves can be positioned between the first and/or second regulator inlets and the piercing member.

20 Claims, 13 Drawing Sheets

Related U.S. Application Data continuation of application No. 15/384,078, filed on Dec. 19, 2016, now Pat. No. 10,201,476, which is a continuation of application No. PCT/US2015/036305, filed on Jun. 17, 2015.

(60) Provisional application No. 62/014,872, filed on Jun. 20, 2014.

(52) U.S. Cl.
CPC ........... *A61J 1/2037* (2015.05); *A61J 1/2055* (2015.05); *A61J 1/2058* (2015.05); *A61J 1/2075* (2015.05); *A61J 1/2082* (2015.05); *A61J 1/2096* (2013.01)

(58) Field of Classification Search
CPC ...... A61J 1/2058; A61J 1/2075; A61J 1/2082; A61J 1/1406; A61J 1/2096
See application file for complete search history.

(56) References Cited

U.S. PATENT DOCUMENTS

| | | | |
|---|---|---|---|
| 2,419,401 A | 4/1947 | Hinds | |
| 2,668,533 A | 2/1954 | Evans | |
| 2,673,013 A | 3/1954 | Hester | |
| 2,852,024 A | 7/1954 | Ryan | |
| 2,793,758 A | 3/1961 | Murrish | |
| 2,999,499 A | 9/1961 | Willet | |
| 2,999,500 A | 9/1961 | Schurer | |
| 3,291,151 A | 12/1966 | Loken | |
| RE26,488 E | 11/1968 | Bull | |
| 3,542,240 A | 11/1970 | Solowey | |
| 3,557,778 A | 1/1971 | Hughes | |
| 3,584,770 A | 6/1971 | Taylor | |
| 3,797,521 A | 3/1974 | King | |
| 3,822,700 A | 7/1974 | Pennington | |
| 3,844,283 A | 10/1974 | Dabney | |
| 3,853,157 A | 12/1974 | Madaio | |
| 3,923,058 A | 12/1975 | Weingarten | |
| 3,938,520 A | 2/1976 | Scislowcz et al. | |
| 3,940,003 A | 2/1976 | Larson | |
| 3,941,167 A | 3/1976 | Haury-Wirtz et al. | |
| 3,957,082 A | 5/1976 | Fuson et al. | |
| 3,980,082 A | 9/1976 | Miller | |
| 3,993,063 A | 11/1976 | Larrabee | |
| 4,046,291 A | 9/1977 | Goda | |
| 4,058,121 A | 11/1977 | Choski et al. | |
| 4,143,853 A | 3/1979 | Abramson | |
| 4,207,923 A | 6/1980 | Giurtino | |
| 4,219,021 A | 8/1980 | Fink | |
| 4,240,433 A | 12/1980 | Bordow | |
| 4,240,833 A | 12/1980 | Myles | |
| 4,253,459 A | 3/1981 | Willis | |
| 4,262,671 A | 4/1981 | Kersten | |
| 4,301,799 A | 11/1981 | Pope, Jr. et al. | |
| 4,312,349 A | 1/1982 | Cohen | |
| 4,314,586 A | 2/1982 | Folkman | |
| 4,334,551 A | 6/1982 | Pfister | |
| 4,349,035 A | 9/1982 | Thomas et al. | |
| 4,376,634 A | 3/1983 | Prior et al. | |
| 4,381,776 A | 5/1983 | Latham, Jr. | |
| 4,396,016 A | 8/1983 | Becker | |
| 4,410,321 A | 10/1983 | Pearson et al. | |
| 4,458,733 A | 7/1984 | Lyons | |
| 4,475,915 A | 10/1984 | Sloane | |
| 4,493,348 A | 1/1985 | Lemmons | |
| 4,505,709 A | 3/1985 | Froning et al. | |
| 4,534,758 A | 8/1985 | Akers et al. | |
| 4,564,054 A | 1/1986 | Gustavsson | |
| 4,573,993 A | 3/1986 | Hoag et al. | |
| 4,576,211 A | 3/1986 | Valentini et al. | |
| 4,588,403 A | 5/1986 | Weiss et al. | |
| 4,600,040 A | 7/1986 | Naslund | |
| 4,645,073 A | 2/1987 | Homan | |
| 4,673,404 A | 6/1987 | Gustavsson | |
| 4,730,635 A | 3/1988 | Linden | |
| 4,735,608 A | 4/1988 | Sardam | |
| 4,743,243 A | 5/1988 | Vaillancourt | |
| 4,768,568 A | 9/1988 | Fournier et al. | |
| 4,785,859 A | 11/1988 | Gustavsson et al. | |
| 4,798,578 A | 1/1989 | Ranford | |
| 4,857,068 A | 8/1989 | Kahn | |
| 4,929,230 A | 5/1990 | Pfleger | |
| 4,981,464 A | 1/1991 | Suzuki | |
| 5,006,114 A | 4/1991 | Rogers | |
| 5,060,704 A | 10/1991 | Rohrbough | |
| 5,169,393 A | 12/1992 | Moorehead et al. | |
| 5,176,673 A | 1/1993 | Marrucchi | |
| 5,334,163 A | 8/1994 | Sinnett | |
| 5,349,984 A | 9/1994 | Weinheimer et al. | |
| 5,405,331 A | 4/1995 | Behnke et al. | |
| 5,445,630 A | 8/1995 | Richmond | |
| 5,478,337 A | 12/1995 | Okamoto et al. | |
| 5,580,351 A | 12/1996 | Helgren et al. | |
| 5,660,796 A | 8/1997 | Sheehy | |
| 5,685,866 A | 11/1997 | Lopez | |
| 5,700,245 A | 12/1997 | Sancoff et al. | |
| 5,725,500 A | 3/1998 | Micheler | |
| 5,749,394 A | 5/1998 | Boehmer et al. | |
| 5,766,147 A | 6/1998 | Sancoff et al. | |
| 5,772,079 A | 6/1998 | Gueret | |
| 5,776,125 A | 7/1998 | Dudar et al. | |
| 5,803,311 A | 9/1998 | Fuchs | |
| 5,833,213 A | 11/1998 | Ryan | |
| 5,890,610 A | 4/1999 | Jansen et al. | |
| 6,003,553 A | 12/1999 | Wahlberg | |
| 6,013,051 A * | 1/2000 | Nelson | A61M 39/0208 604/93.01 |
| 6,071,270 A | 6/2000 | Fowles et al. | |
| 6,139,534 A * | 10/2000 | Niedospial, Jr. | A61J 1/2096 604/414 |
| 6,159,192 A | 12/2000 | Fowles et al. | |
| 6,221,041 B1 * | 4/2001 | Russo | A61J 1/2089 604/82 |
| 6,238,372 B1 * | 5/2001 | Zinger | A61M 39/18 604/32 |
| 6,358,236 B1 | 3/2002 | DeFoggi et al. | |
| 6,457,488 B2 | 10/2002 | Loo | |
| 6,478,788 B1 | 11/2002 | Aneas | |
| 6,503,240 B1 * | 1/2003 | Niedospial, Jr. | A61J 1/2096 604/414 |
| 6,544,246 B1 * | 4/2003 | Niedospial, Jr. | A61J 1/2096 604/414 |
| 6,551,299 B2 | 4/2003 | Miyoshi et al. | |
| 6,572,256 B2 | 6/2003 | Seaton et al. | |
| 6,679,290 B2 | 1/2004 | Matthews et al. | |
| 6,692,478 B1 | 2/2004 | Paradis | |
| 6,715,520 B2 | 4/2004 | Andreasson et al. | |
| 6,719,719 B2 | 4/2004 | Carmel et al. | |
| 6,832,994 B2 | 12/2004 | Niedospial, Jr. et al. | |
| 6,890,328 B2 | 5/2005 | Fowles et al. | |
| 6,989,002 B2 | 1/2006 | Guala | |
| 6,997,910 B2 | 2/2006 | Howlett et al. | |
| 6,997,917 B2 | 2/2006 | Niedospial, Jr. et al. | |
| 7,004,926 B2 | 2/2006 | Navia et al. | |
| 7,048,720 B1 | 5/2006 | Thorne, Jr. et al. | |
| 7,086,431 B2 | 8/2006 | D'Antonio et al. | |
| 7,101,354 B2 | 9/2006 | Thorne, Jr. et al. | |
| 7,140,401 B2 | 11/2006 | Wilcox et al. | |
| 7,192,423 B2 | 3/2007 | Wong | |
| 7,213,702 B2 | 5/2007 | Takimoto et al. | |
| 7,291,131 B2 | 11/2007 | Call | |
| 7,306,584 B2 | 12/2007 | Wessman et al. | |
| 7,326,194 B2 | 2/2008 | Zinger et al. | |
| 7,354,427 B2 | 4/2008 | Fangrow | |
| 7,507,227 B2 | 3/2009 | Fangrow | |
| 7,510,547 B2 | 3/2009 | Fangrow | |
| 7,510,548 B2 | 3/2009 | Fangrow | |
| 7,513,895 B2 | 4/2009 | Fangrow | |
| 7,530,546 B2 | 5/2009 | Ryan | |
| 7,534,238 B2 | 5/2009 | Fangrow | |
| 7,547,300 B2 | 6/2009 | Fangrow | |
| 7,569,043 B2 | 8/2009 | Fangrow | |

(56) References Cited

U.S. PATENT DOCUMENTS 7,618,408 B2 11/2009 Yandell
7,632,261 B2 12/2009 Zinger et al.
7,645,271 B2 1/2010 Fangrow
7,654,995 B2 2/2010 Warren et al.
7,658,733 B2 2/2010 Fangrow
7,678,333 B2 3/2010 Reynolds et al.
7,703,486 B2 4/2010 Costanzo
7,731,678 B2 6/2010 Tennican et al.
7,743,799 B2 6/2010 Mosler et al.
7,744,580 B2 6/2010 Reboul
7,758,560 B2 7/2010 Connell et al.
7,789,871 B1 9/2010 Yandell
7,799,009 B2 9/2010 Niedospial, Jr. et al.
D630,732 S 1/2011 Lev et al.
7,862,537 B2 1/2011 Zinger et al.
7,879,018 B2 2/2011 Zinger et al.
7,883,499 B2 2/2011 Fangrow
7,887,528 B2 2/2011 Yandell
7,900,659 B2 3/2011 Whitley et al.
D637,713 S 5/2011 Nord et al.
7,942,860 B2 5/2011 Horppu
7,963,954 B2 6/2011 Kavazov
D641,080 S 7/2011 Zinger et al.
7,972,321 B2 7/2011 Fangrow
7,975,733 B2 7/2011 Horppu et al.
7,981,089 B2 7/2011 Weilbacher
7,981,101 B2 7/2011 Walsh
7,998,106 B2 8/2011 Thorne, Jr. et al.
8,021,325 B2 9/2011 Zinger et al.
8,025,653 B2 9/2011 Capitqaine et al.
8,029,747 B2 10/2011 Helmerson
8,074,964 B2 12/2011 Mansour et al.
8,096,525 B2 1/2012 Ryan
8,100,154 B2 1/2012 Reynolds et al.
8,109,285 B2 2/2012 Ehrman et al.
8,123,736 B2 2/2012 Kraushaar et al.
8,141,601 B2 3/2012 Fehr et al.
8,156,971 B2 4/2012 Costanzo
8,162,006 B2 4/2012 Guala
8,162,013 B2 4/2012 Rosenquist et al.
8,162,914 B2 4/2012 Kraushaar et al.
8,167,863 B2 5/2012 Yow
8,167,864 B2 5/2012 Browne
8,172,794 B2 5/2012 Lum et al.
8,177,768 B2 5/2012 Leinsing
8,196,614 B2 6/2012 Kriheli
8,197,459 B2 6/2012 Jansen et al.
8,206,367 B2 6/2012 Warren et al.
8,211,082 B2 7/2012 Hasegawa et al.
8,221,382 B2 7/2012 Moy et al.
8,225,826 B2 7/2012 Horppu et al.
8,231,567 B2 7/2012 Tennican et al.
8,241,265 B2 8/2012 Moy et al.
8,262,643 B2 9/2012 Tennican
8,267,127 B2 9/2012 Kriheli
8,267,913 B2 9/2012 Fangrow
8,281,807 B2 10/2012 Trombley, III et al.
8,286,936 B2 10/2012 Kitani et al.
8,287,513 B2 10/2012 Ellstrom et al.
8,317,741 B2 11/2012 Kraushaar
8,336,587 B2 12/2012 Rosenquist et al.
8,356,644 B2 1/2013 Chong et al.
8,356,645 B2 1/2013 Chong et al.
8,357,137 B2 1/2013 Yandell
8,366,658 B2 2/2013 Davis et al.
8,381,776 B2 2/2013 Horppu
8,403,905 B2 3/2013 Yow
8,409,164 B2 4/2013 Fangrow
8,409,165 B2 4/2013 Niedospial et al.
8,425,487 B2 4/2013 Beiriger et al.
8,449,521 B2 5/2013 Thorne, Jr. et al.
8,454,579 B2 6/2013 Fangrow, Jr.
8,469,939 B2 6/2013 Fangrow
8,506,548 B2 8/2013 Okiyama
8,511,352 B2 8/2013 Kraus et al.
8,512,307 B2 8/2013 Fangrow
8,522,832 B2 9/2013 Lopez et al.
8,523,838 B2 9/2013 Tornqvist
8,540,692 B2 9/2013 Fangrow
8,602,067 B2 12/2013 Kuhni et al.
8,608,723 B2 12/2013 Lev et al.
8,622,985 B2 1/2014 Ellstrom
8,641,656 B2 * 2/2014 Bene .................. A61M 1/3658
604/6.09
8,657,803 B2 2/2014 Helmerson et al.
8,667,996 B2 3/2014 Gonnelli et al.
8,684,992 B2 4/2014 Sullivan et al.
8,684,994 B2 4/2014 Lev et al.
8,701,696 B2 4/2014 Guala
8,702,675 B2 4/2014 Imai
8,720,496 B2 5/2014 Huwiler et al.
8,721,614 B2 5/2014 Takemoto et al.
8,753,325 B2 6/2014 Lev et al.
8,795,231 B2 8/2014 Chong et al.
8,801,678 B2 8/2014 Panian et al.
8,821,436 B2 9/2014 Mosler et al.
8,827,977 B2 9/2014 Fangrow
8,864,725 B2 10/2014 Ranalletta et al.
8,864,737 B2 10/2014 Hasegawa et al.
8,870,832 B2 10/2014 Raday et al.
8,870,846 B2 10/2014 Davis et al.
8,882,738 B2 11/2014 Fangrow et al.
8,900,212 B2 12/2014 Kubo
8,910,919 B2 12/2014 Bonnal et al.
8,926,554 B2 1/2015 Okuda et al.
8,945,084 B2 2/2015 Warren et al.
8,973,622 B2 3/2015 Lopez
8,974,433 B2 3/2015 Fangrow
8,979,792 B2 3/2015 Lev et al.
8,986,262 B2 3/2015 Young et al.
8,992,501 B2 3/2015 Siefert et al.
9,005,179 B2 4/2015 Fangrow et al.
9,005,180 B2 4/2015 Siefert et al.
9,060,921 B2 6/2015 Siefert et al.
9,067,049 B2 6/2015 Panian et al.
9,072,657 B2 7/2015 Siefert et al.
9,089,474 B2 7/2015 Cederschiöld
9,089,475 B2 7/2015 Fangrow
9,101,717 B2 8/2015 Mansour et al.
9,107,808 B2 8/2015 Fangrow
9,117,012 B2 * 8/2015 Basaglia ................. A61M 1/16
9,132,062 B2 9/2015 Fangrow
9,132,063 B2 9/2015 Lev et al.
9,144,646 B2 9/2015 Barron, III et al.
9,198,832 B2 12/2015 Moy et al.
9,205,248 B2 12/2015 Wu et al.
9,211,231 B2 12/2015 Mansour et al.
9,278,206 B2 3/2016 Fangrow
9,345,640 B2 5/2016 Mosler et al.
9,345,641 B2 5/2016 Kraus et al.
9,351,905 B2 5/2016 Fangrow et al.
9,358,182 B2 6/2016 Garfield et al.
9,381,135 B2 7/2016 Reynolds et al.
9,381,137 B2 7/2016 Garfield et al.
9,381,339 B2 7/2016 Wu et al.
9,440,060 B2 9/2016 Fangrow
9,511,989 B2 12/2016 Lopez
9,572,750 B2 2/2017 Mansour et al.
9,585,812 B2 3/2017 Browka et al.
9,597,260 B2 3/2017 Ivosevic
9,610,217 B2 4/2017 Fangrow
9,615,997 B2 4/2017 Fangrow
9,662,272 B2 5/2017 Warren et al.
9,763,855 B2 9/2017 Fangrow et al.
9,827,163 B2 11/2017 Lopez et al.
9,895,291 B2 2/2018 Fangrow
9,919,826 B2 3/2018 Ivosevic
9,931,275 B2 4/2018 Fangrow
9,931,276 B2 4/2018 Lopez
9,987,195 B2 6/2018 Fangrow
9,993,390 B2 6/2018 Seifert et al.
9,993,391 B2 6/2018 Warren et al.
9,999,569 B2 6/2018 Kriheli
10,016,339 B2 7/2018 Guala

(56) References Cited

U.S. PATENT DOCUMENTS 10,022,302 B2 7/2018 Warran et al.
10,071,020 B2 9/2018 Warren et al.
10,086,188 B2 10/2018 Fangrow
10,117,807 B2 11/2018 Fangrow
10,201,476 B2 * 2/2019 Fangrow ............... A61J 1/2037
10,292,904 B2 5/2019 Fangrow
10,299,989 B2 5/2019 Fangrow
10,327,989 B2 6/2019 Fangrow
10,327,991 B2 6/2019 Seifert et al.
10,327,992 B2 6/2019 Fangrow et al.
10,327,993 B2 6/2019 Fangrow et al.
10,369,349 B2 8/2019 Nelson
10,391,293 B2 8/2019 Fangrow
10,406,072 B2 9/2019 Chhikara et al.
10,492,993 B2 12/2019 Seifert et al.
10,688,022 B2 6/2020 Fangrow
10,806,672 B2 10/2020 Fangrow
10,918,573 B2 2/2021 Fangrow
10,987,277 B2 * 4/2021 Fangrow ............... A61J 1/2055
11,013,664 B2 5/2021 Fangrow et al.
11,129,773 B2 9/2021 Fangrow
11,185,471 B2 11/2021 Fangrow
11,504,302 B2 11/2022 Chhikara et al.
11,529,289 B2 12/2022 Fangrow
11,648,181 B2 5/2023 Chhikara et al.
11,654,086 B2 5/2023 Fangrow
11,672,734 B2 6/2023 Fangrow
11,696,871 B2 7/2023 Seifert et al.
11,744,775 B2 9/2023 Chhikara et al.
11,857,499 B2 1/2024 Fangrow
11,963,932 B2 4/2024 Seifert et al.
2001/0029360 A1 * 10/2001 Miyoshi ................ A61J 1/2096
604/533
2002/0087144 A1 7/2002 Zinger et al.
2002/0095133 A1 7/2002 Gillis et al.
2002/0115980 A1 * 8/2002 Niedospial, Jr. ... B65D 47/2031
604/414
2002/0193777 A1 12/2002 Aneas
2003/0153895 A1 8/2003 Leinsing
2003/0216695 A1 11/2003 Yang
2003/0229330 A1 12/2003 Hickle
2004/0073169 A1 4/2004 Amisar et al.
2004/0073189 A1 4/2004 Wyatt et al.
2004/0123868 A1 * 7/2004 Rutter ................ A61M 16/208
128/207.14
2005/0087715 A1 4/2005 Doyle
2005/0131357 A1 6/2005 Denton et al.
2005/0148992 A1 7/2005 Simas, Jr. et al.
2005/0203481 A1 9/2005 Orlu et al.
2006/0025747 A1 2/2006 Sullivan et al.
2006/0106360 A1 * 5/2006 Wong .................... A61M 5/162
604/411
2006/0111667 A1 5/2006 Matsuura et al.
2006/0149309 A1 7/2006 Paul et al.
2006/0184103 A1 8/2006 Paproski et al.
2006/0184139 A1 8/2006 Quigley et al.
2007/0032775 A1 * 2/2007 Niedospial, Jr. ...... A61J 1/2096
604/415
2007/0093775 A1 4/2007 Daly
2007/0106244 A1 * 5/2007 Mosler .................. A61J 1/2096
604/407
2007/0208320 A1 9/2007 Muramatsu et al.
2008/0045919 A1 2/2008 Jakob et al.
2008/0067462 A1 3/2008 Miller et al.
2008/0140021 A1 6/2008 Richmond
2008/0142388 A1 * 6/2008 Whitley ................ A61J 1/2096
206/438
2008/0172003 A1 7/2008 Plishka et al.
2008/0208159 A1 8/2008 Stanus et al.
2008/0287914 A1 11/2008 Wyatt et al.
2009/0057258 A1 3/2009 Tornqvist
2009/0200504 A1 8/2009 Ryan
2010/0000035 A1 1/2010 Lee
2010/0049157 A1 * 2/2010 Fangrow ............... A61M 39/24
604/407
2010/0059474 A1 3/2010 Brandenburger et al.
2010/0076397 A1 * 3/2010 Reed ..................... A61M 5/162
604/411
2010/0084397 A1 * 4/2010 Kubo ................ B65D 51/1633
220/256.1
2010/0106129 A1 4/2010 Goeckner et al.
2010/0160889 A1 6/2010 Smith et al.
2010/0179506 A1 7/2010 Shemesh et al.
2010/0249723 A1 9/2010 Fangrow, Jr.
2010/0305548 A1 12/2010 Kraushaar
2011/0004183 A1 1/2011 Carrez et al.
2011/0062703 A1 * 3/2011 Lopez ................... A61M 39/22
285/129.1
2011/0108158 A1 5/2011 Huwiler et al.
2011/0125104 A1 5/2011 Lynn
2011/0125128 A1 5/2011 Nord et al.
2011/0175347 A1 7/2011 Okiyama
2011/0184382 A1 7/2011 Cady
2011/0208128 A1 8/2011 Wu et al.
2011/0224611 A1 9/2011 Lum et al.
2011/0240158 A1 10/2011 Py
2011/0257621 A1 10/2011 Fangrow
2011/0264037 A1 10/2011 Foshee et al.
2012/0046636 A1 2/2012 Kriheli
2012/0053555 A1 * 3/2012 Ariagno ................ A61J 1/2089
604/416
2012/0059346 A1 3/2012 Sheppard et al.
2012/0067429 A1 3/2012 Mosler et al.
2012/0078091 A1 3/2012 Suchecki
2012/0078214 A1 3/2012 Finke et al.
2012/0078215 A1 3/2012 Finke et al.
2012/0109077 A1 5/2012 Ryan
2012/0157964 A1 6/2012 Haimi
2012/0172830 A1 7/2012 Yokoyama et al.
2012/0215181 A1 8/2012 Lee
2012/0298254 A1 11/2012 Brem et al.
2012/0302986 A1 11/2012 Brem et al.
2013/0030386 A1 1/2013 Panian et al.
2013/0033034 A1 2/2013 Trombley, III et al.
2013/0035668 A1 2/2013 Kitani et al.
2013/0053814 A1 2/2013 Mucientes et al.
2013/0053815 A1 2/2013 Mucientes et al.
2013/0060226 A1 3/2013 Fini et al.
2013/0102974 A1 4/2013 Davis et al.
2013/0110053 A1 5/2013 Yoshino et al.
2013/0130197 A1 5/2013 Jessop et al.
2013/0180618 A1 7/2013 Py
2013/0190684 A1 7/2013 Panian et al.
2013/0218121 A1 8/2013 Waller et al.
2013/0226099 A1 8/2013 Fangrow
2013/0228239 A1 9/2013 Cederschiöld
2013/0306169 A1 11/2013 Weibel
2014/0020792 A1 1/2014 Kraus et al.
2014/0107588 A1 4/2014 Fangrow
2014/0124087 A1 5/2014 Anderson et al.
2014/0124092 A1 5/2014 Gonnelli et al.
2014/0150925 A1 6/2014 Sjogren et al.
2014/0261860 A1 9/2014 Heath et al.
2014/0261877 A1 9/2014 Ivosevic et al.
2014/0276649 A1 9/2014 Ivosevic et al.
2014/0358073 A1 12/2014 Panian et al.
2015/0011963 A1 1/2015 Fangrow
2015/0020920 A1 1/2015 Lev et al.
2015/0065987 A1 3/2015 Fangrow
2015/0082746 A1 3/2015 Ivosevic et al.
2015/0123398 A1 5/2015 Sanders et al.
2015/0126958 A1 5/2015 Sanders et al.
2015/0157848 A1 6/2015 Wu et al.
2015/0202121 A1 7/2015 Seifert
2015/0209230 A1 7/2015 Lev et al.
2015/0209232 A1 7/2015 Haindl
2015/0209233 A1 7/2015 Fukuoka
2015/0250680 A1 9/2015 Browka et al.
2015/0250681 A1 9/2015 Lev et al.
2015/0265500 A1 9/2015 Russo et al.
2015/0297451 A1 10/2015 Marici et al.
2015/0297453 A1 10/2015 Kim et al.

(56) References Cited

U.S. PATENT DOCUMENTS

| | | | |
|---|---|---|---|
| 2015/0297454 | A1 | 10/2015 | Sanders et al. |
| 2015/0297456 | A1 | 10/2015 | Marici et al. |
| 2015/0297459 | A1 | 10/2015 | Sanders et al. |
| 2015/0297461 | A1 | 10/2015 | Fangrow |
| 2015/0297817 | A1 | 10/2015 | Guala |
| 2015/0297839 | A1 | 10/2015 | Sanders et al. |
| 2015/0320642 | A1 | 11/2015 | Fangrow |
| 2015/0320992 | A1 | 11/2015 | Bonnet et al. |
| 2015/0359709 | A1 | 12/2015 | Kriheli et al. |
| 2015/0366758 | A1 | 12/2015 | Noguchi et al. |
| 2016/0000653 | A1 | 1/2016 | Kramer |
| 2016/0008534 | A1 | 1/2016 | Cowan et al. |
| 2016/0038373 | A1 | 2/2016 | Ohlin |
| 2016/0038374 | A1 | 2/2016 | Merhold et al. |
| 2016/0051446 | A1 | 2/2016 | Lev et al. |
| 2016/0058667 | A1 | 3/2016 | Kriheli |
| 2016/0081878 | A1 | 3/2016 | Marks et al. |
| 2016/0081879 | A1 | 3/2016 | Garfield et al. |
| 2016/0101020 | A1 | 4/2016 | Guala |
| 2016/0106970 | A1 | 4/2016 | Fangrow |
| 2016/0120753 | A1 | 5/2016 | Warren |
| 2016/0120754 | A1 | 5/2016 | Warren |
| 2016/0136051 | A1 | 5/2016 | Lavi |
| 2016/0136412 | A1 | 5/2016 | McKinnon et al. |
| 2016/0206511 | A1 | 7/2016 | Garfield et al. |
| 2016/0206512 | A1 | 7/2016 | Chhikara et al. |
| 2016/0213568 | A1 | 7/2016 | Mansour et al. |
| 2016/0250102 | A1 | 9/2016 | Garfield et al. |
| 2016/0262981 | A1 | 9/2016 | Carrez et al. |
| 2016/0262982 | A1 | 9/2016 | Cederschiold |
| 2016/0338911 | A1 | 11/2016 | Fangrow |
| 2017/0007501 | A1 | 1/2017 | Schuldt-Lieb et al. |
| 2017/0027820 | A1 | 2/2017 | Okiyama et al. |
| 2017/0095404 | A1 | 4/2017 | Fangrow |
| 2017/0196772 | A1 | 7/2017 | Seifert |
| 2017/0196773 | A1 | 7/2017 | Fangrow |
| 2017/0202742 | A1 | 7/2017 | Cheng et al. |
| 2017/0202744 | A1 | 7/2017 | Fangrow |
| 2017/0202745 | A1 | 7/2017 | Seifert |
| 2017/0239140 | A1 | 8/2017 | Fangrow |
| 2017/0258682 | A1 | 9/2017 | Kriheli |
| 2017/0296431 | A1 | 10/2017 | Fangrow |
| 2017/0312176 | A1 | 11/2017 | Fangrow |
| 2017/0333288 | A1 | 11/2017 | Fangrow |
| 2018/0028402 | A1 | 2/2018 | Kriheli et al. |
| 2018/0099137 | A1 | 4/2018 | Fangrow |
| 2018/0125759 | A1 | 5/2018 | Fangrow |
| 2018/0161245 | A1 | 6/2018 | Kriheli |
| 2018/0193227 | A1 | 7/2018 | Marci et al. |
| 2018/0207063 | A1 | 7/2018 | Lopez et al. |
| 2018/0221572 | A1 | 8/2018 | Schlitt et al. |
| 2018/0250195 | A1 | 9/2018 | Fangrow |
| 2018/0280240 | A1 | 10/2018 | Fangrow |
| 2019/0000717 | A1 | 1/2019 | Fangrow |
| 2019/0001114 | A1 | 1/2019 | Fangrow |
| 2019/0117515 | A1 | 4/2019 | Fangrow |
| 2019/0254926 | A1 | 8/2019 | Seifert |
| 2019/0269900 | A1 | 9/2019 | Fangrow |
| 2019/0350812 | A1 | 11/2019 | Chhikara |
| 2019/0358125 | A1 | 11/2019 | Chhikara |
| 2020/0006372 | A1 | 1/2020 | Zhang et al. |
| 2020/0038293 | A1 | 2/2020 | Chhikara et al. |
| 2020/0069519 | A1 | 3/2020 | Fangrow |
| 2020/0069520 | A1 | 3/2020 | Fangrow |
| 2020/0093695 | A1 | 3/2020 | Seifert |
| 2020/0337948 | A1 | 10/2020 | Fangrow |
| 2021/0106499 | A1 | 4/2021 | Fangrow |
| 2021/0205175 | A1 | 7/2021 | Fangrow |
| 2021/0353500 | A1 | 11/2021 | Warren |
| 2022/0000798 | A1 | 1/2022 | Robbins et al. |
| 2023/0075991 | A1 | 3/2023 | Chhikara |
| 2023/0225943 | A1 | 7/2023 | Fangrow |
| 2023/0355476 | A1 | 11/2023 | Fangrow |
| 2024/0024197 | A1 | 1/2024 | Chhikara |
| 2024/0091104 | A1 | 3/2024 | Fangrow |
| 2024/0156685 | A1 | 5/2024 | Fangrow |
| 2024/0252399 | A1 | 8/2024 | Seifert |
| 2024/0315926 | A1 | 9/2024 | Fangrow |

FOREIGN PATENT DOCUMENTS

| | | |
|---|---|---|
| CN | 101801440 A | 8/2010 |
| EP | 0 829 250 | 3/1998 |
| EP | 2 036 529 | 3/2009 |
| EP | 2 744 469 | 10/2022 |
| GB | 2 000 685 | 1/1979 |
| JP | 39-17386 | 8/1961 |
| JP | 45-20604 | 8/1970 |
| JP | 57-208362 | 12/1982 |
| JP | H02-193677 | 7/1990 |
| JP | H06-66682 | 9/1994 |
| JP | 2001-505083 | 4/2001 |
| JP | 2011-516172 | 5/2011 |
| JP | 2012-228332 | 11/2012 |
| JP | 2014-511249 | 5/2014 |
| JP | 2015-077217 | 4/2015 |
| JP | 2015-211763 | 11/2015 |
| JP | 2019-69323 | 5/2019 |
| RU | 2264231 | 2/2005 |
| WO | WO 1984/004673 | 12/1984 |
| WO | WO 1997/02853 | 1/1997 |
| WO | WO 2000/035517 | 6/2000 |
| WO | WO 2005/065626 | 7/2005 |
| WO | WO 2008/036101 | 3/2008 |
| WO | WO 2008/153459 | 12/2008 |
| WO | WO 2008/153460 | 12/2008 |
| WO | WO 2009/097146 | 8/2009 |
| WO | WO 2009/105489 | 8/2009 |
| WO | WO 2009/146088 | 12/2009 |
| WO | WO 2010/069359 | 6/2010 |
| WO | WO 2010/093581 | 8/2010 |
| WO | WO 2010/120953 | 10/2010 |
| WO | WO 2011/030787 | 3/2011 |
| WO | WO 2011/052481 | 5/2011 |
| WO | WO 2013/104736 | 7/2013 |
| WO | WO 2013/134246 | 9/2013 |
| WO | WO 2014/116602 | 7/2014 |
| WO | WO 2015/029018 | 3/2015 |
| WO | WO 2015/118432 | 8/2015 |
| WO | WO 2015/166993 | 11/2015 |
| WO | WO 2016/147178 | 9/2016 |
| WO | WO 2018/064206 | 4/2018 |
| WO | WO 2018/186361 | 10/2018 |

OTHER PUBLICATIONS

ICU's Response dated Dec. 8, 2023 to European Opposition (dated Jul. 24, 2023), re EP Application No. 12823375.6.

Opposer's Response to ICU's Response to the Opposition, dated Mar. 4, 2024, re EP Application No. 12823375.6.

Summons to attend oral proceedings, dated Apr. 12, 2024,re EP Application No. 12823375.6.

English translation of Notice of Opposition filed by B. Braun Melsungen AG against European Patent No. EP 2 744 469 B1, dated Jul. 19, 2023.

Reply to Opposition filed against European Patent No. EP 2 744 469 B1, dated Dec. 8, 2023.

Auxiliary Requests filed with Reply to Opposition filed against European Patent No. EP 2 744 469 B1, dated Dec. 8, 2023.

Opposer's Response to Reply to Opposition filed against European Patent No. EP 2 744 469 B1, dated Feb. 27, 2024.

Preliminary Opinion of the European Patent Office in Opposition filed against European Patent No. EP 2 744 469 B1, dated Apr. 12, 2024.

Wehmeir, Sally: "Oxford Advanced Learner's" Oxford University Press, 2000—in two pages.

Wikipedia, "Check Valve," [https://en.wikipedia.org/wiki/Check_valve], Aug. 16, 2011, in four pages.

Clave—NeedleFree Connector, 2-page brochure. Jan. 2012 ICU Medical, Inc. (M1-1065 Rev. 04).

(56) References Cited

OTHER PUBLICATIONS

Equashield, Hazardous Drugs Closed System Transfer Device. Two webpages: http:/www.equashield.com, downloaded Jul. 22, 2013.
Genie—Closed Vial Access Device, 2-page brochure. Jan. 2012 ICU Medical, Inc. (M1-1186 Rev. 11).
International Preliminary Report on Patentability issued on Dec. 20, 2016, re PCT Application No. PCT/US2015/036305.
International Search Report and Written Opinion mailed Aug. 31, 2015, re PCT Application No. PCT/US2015/036305.
OnGuard Contained Medication System with Tevadaptor Components, B. Braun Medical, Inc., Apr. 2007.
Phaseal, How to Use PhaSeal®, http://www.phaseal.com/siteUS/movies.asp?main=filmsmain&right=filmsright, dated Jul. 25, 2005.
Phaseal, The PhaSeal® Solution, http://www.phaseal.com/siteUS/page.asp?menuitem=145&right=0, dated Jan. 9, 2006.
"Protection Safety Products", IV Sets and Access Devices Medication Delivery Catalog, Chemo-Aide Dispensing Pin, Dec. 2002, pp. 7,21, Baxter Healthcare Corporation, Round Lake, IL.
Spiros—Closed Male Luer. 2-page brochure. Jan. 2012 ICU Medical, Inc. (M1-1184 Rev. 11).
ICU's Response Letter dated Aug. 5, 2024, regarding the Preliminary Opinion of the EPO Opposition (Opposition filed against European Patent No. EP 2 744 469 B1).
Braun's response/comments with English translation dated Sep. 6, 2024, to ICU's response dated Aug. 5, 2024 (Opposition filed against European Patent No. EP 2 744 469 B1).
Minutes, Oral Proceedings, re EP App., 12823375.6, dated Nov. 25, 2024.
EPO Decision on Opposition filed against European Patent No. EP 2 744 469, dated Nov. 25, 2024, in 30 pages.

* cited by examiner

PRESSURE-REGULATING VIAL ADAPTORS

RELATED APPLICATIONS

This application is a continuation of U.S. patent application Ser. No. 16/223,499, filed Dec. 18, 2018, entitled "PRESSURE-REGULATING VIAL ADAPTORS," which is a continuation of U.S. patent application Ser. No. 15/384,078, filed Dec. 19, 2016, now U.S. Pat. No. 10,201,476, entitled "PRESSURE-REGULATING VIAL ADAPTORS," which claims the benefit of International Application No. PCT/US2015/036305, filed on Jun. 17, 2015, entitled "PRESSURE-REGULATING VIAL ADAPTORS." which claims the benefit of priority to U.S. Provisional Patent Application No. 62/014,872, filed on Jun. 20, 2014, entitled "PRESSURE-REGULATING VIAL ADAPTORS," the entire contents of which are incorporated by reference herein and made part of this specification.

SUMMARY

According to some embodiments of the present disclosure, an adaptor configured to couple with a sealed vial can include a connector interface. The adaptor can include one or more access channels (e.g., passages). In some cases the one or more access channels are in fluid communication with the connector interface. The adaptor can include a piercing member. The piercing member can include a regulator channel. The adaptor can include a regulator assembly. The regulator assembly can include a first regulator inlet. In some cases, the regulator includes a second regulator inlet. One or more of the first and second regulator inlets can include a filter configured to filter fluid passing into and/or out of the respective regulator inlets. One or more valves can be positioned between the first and/or second regulator inlets and the piercing member.

According to some variants, an adaptor configured to couple with a sealed vial can include a connector interface. In some embodiments, the adaptor includes an access channel. The access channel can be in fluid communication with the connector interface. In some cases, the adaptor includes a regulator assembly. The regulator assembly can include a first regulator inlet. The first regulator inlet can be in fluid communication with an ambient environment surrounding the adaptor. In some embodiments, the regulator assembly includes a first regulator lumen. In some cases, the regulator assembly includes a second regulator inlet. The second regulator inlet can be in fluid communication with the ambient environment. In some cases, the regulator assembly includes a second regulator lumen. In some embodiments, the regulator assembly includes a first filter. The first filter can be capable of fluid communication with the first regulator lumen. In some embodiments, the first filter is configured to filter fluid passing into the first regulator lumen. The regulator assembly can include a second filter. The second filter can be in fluid communication with the second regulator lumen. In some embodiments, the second filter is configured to filter fluid passing from the second regulator lumen and into the ambient environment. In some embodiments, the regulator assembly includes a regulator valve. The regulator valve can be in fluid communication with the first regulator lumen. In some embodiments, the regulator valve is configured to permit passage of fluid from the ambient environment into the first regulator lumen. In some cases, the regulator valve is configured to prevent passage of fluid from within the vial to the first filter. The adaptor can include a piercing member. The piercing member can include a proximal end and a distal end. In some embodiments, the distal end comprises a piercing tip. In some cases, the adaptor includes a regulator channel. The regulator channel can be positioned at least partially within the piercing member. In some embodiments, the regulator channel includes a first regulator channel opening in fluid communication with the first regulator lumen. In some embodiments, the adaptor can be used in conjunction with a sealed vial.

In some embodiments, the regulator valve comprises a valve stem and/or a flap portion. In some cases, the flap portion comprises a concave side and/or a convex side. In some embodiments, the first regulator lumen and the second regulator lumen are in fluid communication with each other. In some configurations, the regulator valve is positioned in a plug portion. In some cases, the plug portion can be inserted into the regulator lumen. In some embodiments, the plug portion is flexible. In some embodiments, the plug portion is retained within the regulator lumen (e.g., by a friction fit). In some cases, a cap portion limits the extent to which the plug portion is inserted into the regulator lumen. In some embodiments, the first filter is positioned in the plug portion. In some cases, the first filter is positioned within the first regulator lumen. In some embodiments, the second filter is positioned within the second regulator lumen. In some cases, the first and second filters are positioned along a common line. In some embodiments, the common line is generally perpendicular to the regulator channel. In some cases, the regulator valve is positioned along the common line.

According to some variants, a method of manufacturing a vial adaptor can include providing a connector interface. In some embodiments, the method includes providing an access channel. The access channel can be in fluid communication with the connector interface. The method can include providing a regulator assembly. The regulator assembly can include a first regulator inlet. The first regulator include can be in fluid communication with an ambient environment surrounding the adaptor. In some cases, the regulator assembly includes a second regulator inlet. The second regulator inlet can be in fluid communication with the ambient environment. The regulator assembly can include a first filter. The first filter can be configured to filter fluid passing into the vial adaptor. In some embodiments, the regulator assembly includes a second filter. The second filter can be configured to filter fluid passing from the vial adaptor into the ambient environment. In some cases, the regulator assembly includes a regulator valve. The regulator valve can be configured to permit passage of fluid from the ambient environment into the vial adaptor. In some embodiments, the regulator valve is configured to inhibit passage of fluid from within the vial to the first filter. The method can include providing a piercing member. The piercing member can include a proximal end and a distal end. In some cases, the distal end includes a piercing tip. In some embodiments, the method includes providing a regulator channel. The regulator channel can be positioned at least partially within the piercing member. In some embodiments, the regulator channel includes a first regulator channel opening. In some cases, the regulator channel is in fluid communication with the second filter and/or with the regulator valve. In some embodiments, the first and second regulator inlets are provided along a common line that is generally perpendicular to the regulator channel. In some cases, the regulator valve is providing along the common line. In some embodiments, the regulator valve is configured to prevent passage of fluid from within the vial to the first filter. In some cases, the regulator valve comprises a valve stem and/or a flap portion. In some embodiments, the flap portion has a concave side and/or a convex side

BACKGROUND

Field

Certain embodiments disclosed herein relate to adaptors for coupling with medicinal vials, and components thereof, and methods to contain vapors and/or to aid in regulating pressures within medicinal vials.

Description of Related Art

It is a common practice to store medicines or other medically related fluids in vials or other containers. In some instances, the medicines or fluids so stored are therapeutic if injected into the bloodstream, but harmful if inhaled or if contacted by exposed skin. Certain known systems for extracting potentially harmful medicines from vials suffer from various drawbacks.

BRIEF DESCRIPTION OF THE DRAWINGS

Various embodiments are depicted in the accompanying drawings for illustrative purposes, and should in no way be interpreted as limiting the scope of the embodiments. In addition, any features of different disclosed embodiments can be combined to form additional embodiments, which are part of this disclosure.

DETAILED DESCRIPTION OF CERTAIN EMBODIMENTS

Figure 1:
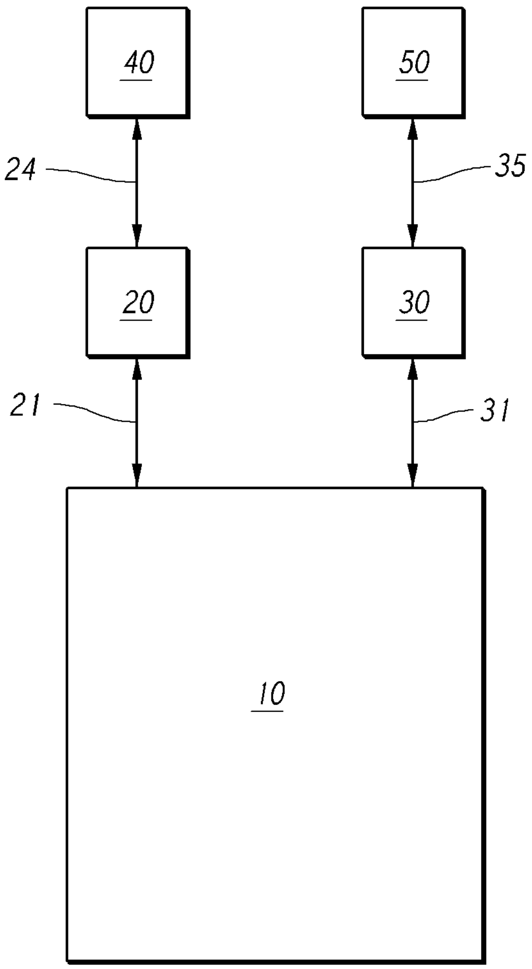
FIG. 1 schematically illustrates a system for removing compounds from and/or injecting compounds into a vial.

FIG. 1 is a schematic illustration of a container 10, such as a medicinal vial, that can be coupled with an accessor 20 and a regulator 30. In certain arrangements, the regulator 30 allows the removal of some or all of the contents of the container 10 via the accessor 20 without a significant change of pressure within the container 10. In some embodiments, the regulator 30 can include one or more portions of any of the example regulators shown and/or described in International Patent Publication Number WO 2013/025946, titled PRESSURE-REGULATING VIAL ADAPTORS, filed Aug. 16, 2012, the entire contents of which are incorporated by reference and made part of this specification. Every individual structure, component, feature, or step that is illustrated or described in any embodiment in this specification can be used alone or in combination with any other structure, component, feature, or step that is illustrated or described in any other embodiment in this specification. No structure, component, feature, or step in this specification is indispensable or essential, but rather can be omitted in some embodiments.

In general, the container 10 is hermetically sealed to preserve the contents of the container 10 in a sterile environment. The container 10 can be evacuated or pressurized upon sealing. In some instances, the container 10 is partially or completely filled with a liquid, such as a drug or other medical fluid. In such instances, one or more gases can also be sealed in the container 10. In some instances, a solid or powdered substance, such as a lyophilized pharmaceutical, is disposed in the container 10.

The accessor 20 generally provides access to contents of the container 10 such that the contents may be removed or added to. In certain arrangements, the accessor 20 includes an opening between the interior and exterior of the container 10. The accessor 20 can further comprise a passageway between the interior and exterior of the container 10. In some configurations, the passageway of the accessor 20 can be selectively opened and closed. In some arrangements, the accessor 20 comprises a conduit extending through a surface of the container 10. The accessor 20 can be integrally formed with the container 10 prior to the sealing thereof or introduced to the container 10 after the container 10 has been sealed.

In some configurations, the accessor 20 is in fluid communication with the container 10, as indicated by an arrow 21. In certain of these configurations, when the pressure inside the container 10 varies from that of the surrounding environment, the introduction of the accessor 20 to the container 10 causes a transfer through the accessor 20. For example, in some arrangements, the pressure of the environment that surrounds the container 10 exceeds the pressure within the container 10, which may cause ambient air from the environment to ingress through the accessor 20 upon insertion of the accessor 20 into the container 10. In other arrangements, the pressure inside the container 10 exceeds that of the surrounding environment, causing the contents of the container 10 to egress through the accessor 20.

In some configurations, the accessor 20 is coupled with an exchange device 40. In certain instances, the accessor 20 and the exchange device 40 are separable. In some instances, the accessor 20 and the exchange device 40 are integrally formed. The exchange device 40 is configured to accept fluids and/or gases from the container 10 via the accessor 20, to introduce fluids and/or gases to the container 10 via the accessor 20, or to do some combination of the two. In some arrangements, the exchange device 40 is in fluid communication with the accessor 20, as indicated by an arrow 24. In certain configurations, the exchange device 40 comprises a medical instrument, such as a syringe.

In some instances, the exchange device 40 is configured to remove some or all of the contents of the container 10 via the accessor 20. In certain arrangements, the exchange device 40 can remove the contents independent of pressure differences, or lack thereof, between the interior of the container 10 and the surrounding environment. For example, in instances where the pressure outside of the container 10 exceeds that within the container 10, an exchange device 40 comprising a syringe can remove the contents of the container 10 if sufficient force is exerted to extract the plunger from the syringe. The exchange device 40 can similarly introduce fluids and/or gases to the container 10 independent of pressure differences between the interior of the container 10 and the surrounding environment.

In certain configurations, the regulator 30 is coupled with the container 10. The regulator 30 generally regulates the pressure within the container 10. As used herein, the term "regulate," or any derivative thereof, is a broad term used in its ordinary sense and includes, unless otherwise noted, any active, affirmative, or positive activity, or any passive, reactive, respondent, accommodating, or compensating activity that tends to effect a change. In some instances, the regulator 30 substantially maintains a pressure difference, or equilibrium, between the interior of the container 10 and the surrounding environment. As used herein, the term "maintain," or any derivative thereof, is a broad term used in its ordinary sense and includes the tendency to preserve an original condition for some period, with some small degree of variation permitted as may be appropriate in the circumstances. In some instances, the regulator 30 maintains a substantially constant pressure within the container 10. In certain instances, the pressure within the container 10 varies by no more than about 1 psi, no more than about 2 psi, no more than about 3 psi, no more than about 4 psi, or no more than about 5 psi. In still further instances, the regulator 30 equalizes pressures exerted on the contents of the container 10. As used herein, the term "equalize," or any derivative thereof, is a broad term used in its ordinary sense and includes the tendency for causing quantities to be the same or close to the same, with some small degree of variation permitted as may be appropriate in the circumstances. In certain configurations, the regulator 30 is coupled with the container 10 to allow or encourage equalization of a pressure difference between the interior of the container 10 and some other environment, such as the environment surrounding the container 10 or an environment within the exchange device 40. In some arrangements, a single device comprises the regulator 30 and the accessor 20. In other arrangements, the regulator 30 and the accessor 20 are separate units.

The regulator 30 is generally in communication with the container 10, as indicated by an arrow 31, and a reservoir 50, as indicated by another arrow 35. In some configurations, the reservoir 50 comprises at least a portion of the environment surrounding the container 10. In some cases, the reservoir 50 is the ambient environment surrounding the container 10.

In certain embodiments, the regulator 30 provides fluid communication between the container 10 and the reservoir 50. In certain of such embodiments, the fluid in the reservoir 50 (e.g., in the surrounding environment) includes mainly gas so as not to appreciably dilute liquid contents of the container 10. In some arrangements, the regulator 30 comprises a filter to purify or remove contaminants from the gas or liquid entering the container 10, thereby reducing the risk of contaminating the contents of the container 10. In certain arrangements, the filter is hydrophobic such that air can enter the container 10 but fluid cannot escape therefrom. In some configurations, the regulator 30 comprises an orientation-actuated or orientation-sensitive check valve which selectively inhibits fluid communication between the container 10 and the filter. In some configurations, the regulator 30 comprises a check valve which selectively inhibits fluid communication between the container 10 and the filter when the valve and/or the container 10 are oriented so that the regulator 30 is held above (e.g., further from the floor than) the regulator 30.

Figure 2:
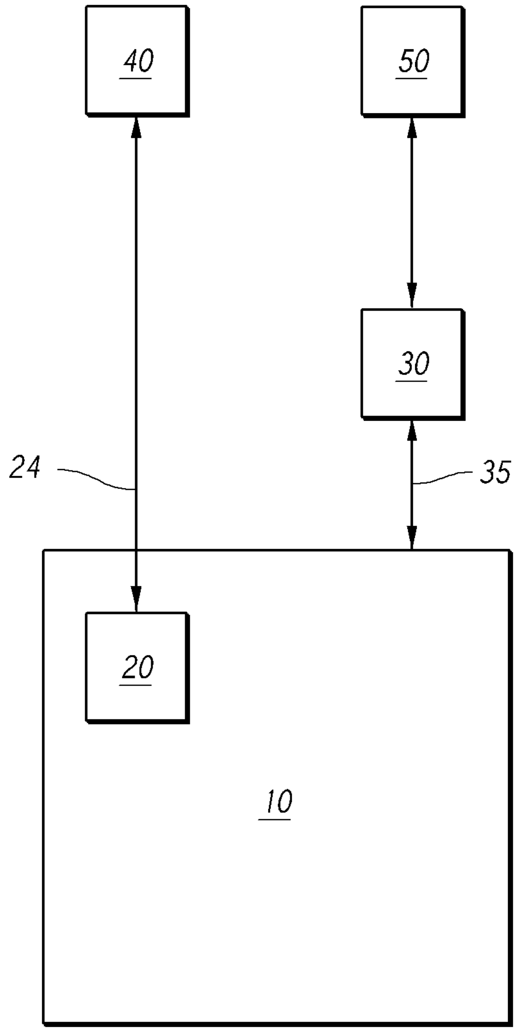
FIG. 2 schematically illustrates another system for removing compounds from and/or injecting compounds into a vial.

As schematically illustrated in FIG. 2, in certain embodiments, the accessor 20, or some portion thereof, is located within the container 10. As detailed above, the accessor 20 can be integrally formed with the container 10 or separate therefrom. In some embodiments, the regulator 30, or some portion thereof, is located outside the container 10. In some arrangements, the regulator 30 is integrally formed with the container 10. It is possible to have any combination of the accessor 20, or some portion thereof, entirely within, partially within, or outside of the container 10 and/or the regulator 30, or some portion thereof, entirely within, partially within, or outside of the container 10.

In certain embodiments, the accessor 20 is in fluid communication with the container 10. In further embodiments, the accessor 20 is in fluid communication with the exchange device 40, as indicated by the arrow 24.

The regulator 30 can be in fluid or non-fluid communication with the container 10. In some embodiments, the regulator 30 is located entirely outside the container 10. In some embodiments, the regulator 30 is in communication, either fluid or non-fluid, with the reservoir 50, as indicated by the arrow 35.

Figure 2A:
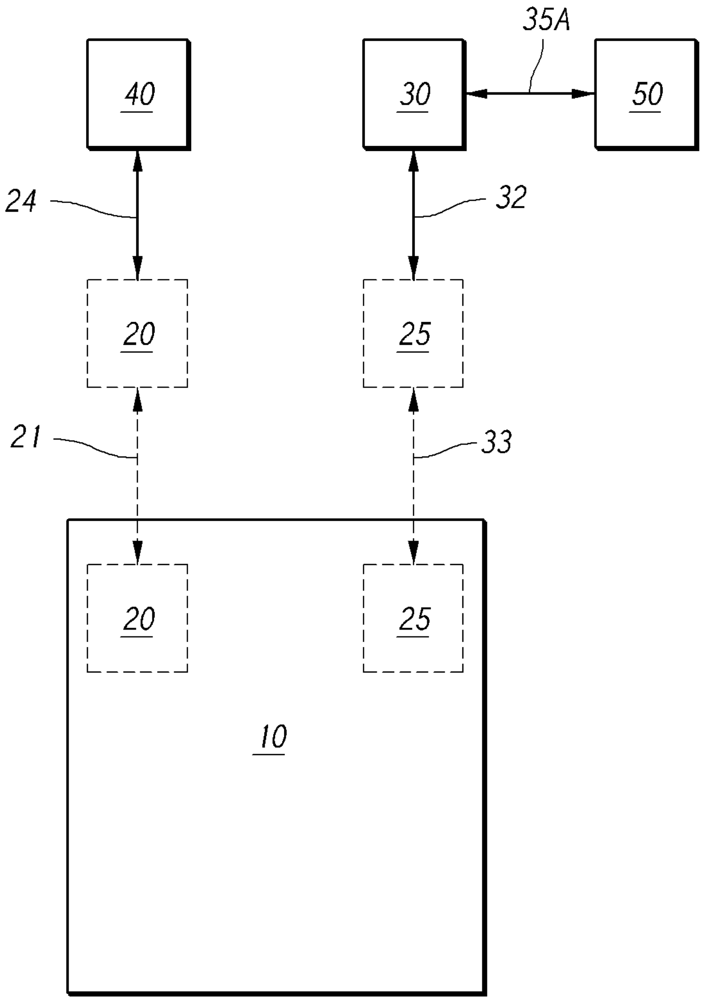
FIG. 2A schematically illustrates another system for removing compounds from and/or injecting compounds into a vial.

As schematically illustrated in FIG. 2A, in certain embodiments, the accessor 20, or some portion thereof, can be located within the container 10. In some embodiments, the accessor 20, or some portion thereof, can be located outside the container 10. In some embodiments, a valve 25, or some portion thereof, can be located outside the container 10. In some embodiments, the valve 25, or some portion thereof, can be located within the container 10. In some embodiments, the regulator 30 is located entirely outside the container 10. In some embodiments, the regulator 30, or some portion thereof, can be located within the container 10. It is possible to have any combination of the accessor 20, or some portion thereof, entirely within, partially within, or outside of the container 10 and/or the valve 25, or some portion thereof, entirely within, partially within, or outside of the container 10. It is also possible to have any combination of the accessor 20, or some portion thereof, entirely within, partially within, or outside of the container 10 and/or the regulator 30, or some portion thereof, entirely within, partially within, or outside of the container 10.

The accessor 20 can be in fluid communication with the container 10, as indicated by the arrow 21. In some embodiments, the accessor 20 can be in fluid communication with the exchange device 40, as indicated by the arrow 24.

In certain embodiments, the regulator 30 can be in fluid or non-fluid communication with a valve 25, as indicated by the arrow 32. In some embodiments, the valve 25 can be integrally formed with the container 10 or separate therefrom. In some embodiments, the valve 25 can be integrally formed with the regulator 30 or separate therefrom. In certain embodiments, the valve 25 can be in fluid or non-fluid communication with the container 10, as indicated by the arrow 33.

In some embodiments the regulator 30 can be in fluid or non-fluid communication with the reservoir 50 (e.g., the ambient surroundings), as indicated by the arrow 35A.

According to some configurations, the regulator 30 can comprise a filter. In some embodiments, the filter can selectively inhibit passage of liquids and/or contaminants between the valve 25 and the reservoir 50. In some embodiments, the filter can selectively inhibit passage of liquids and/or contaminants between the reservoir 50 and the valve 25.

In some embodiments, the valve 25 can be a one-way check valve. In some embodiments, the valve 25 can be a two-way valve. According to some configurations, the valve 25 can selectively inhibit liquid communication between the filter and/or reservoir 50 and the container 10.

Figure 2B:
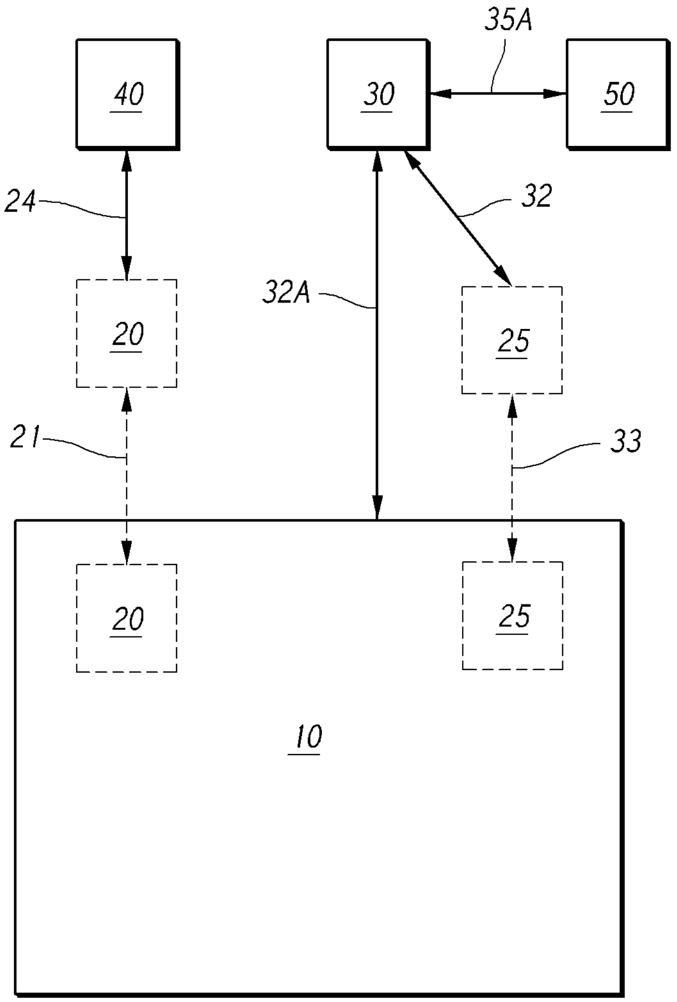
FIG. 2B schematically illustrates another system for removing compounds from and/or injecting compounds into a vial.

As illustrated in FIG. 2B, the regulator 30 can include a non-valved fluid connection 32A between the container 10, the regulator 30, and the reservoir 50. In some embodiments, the non-valved fluid connection is a second inlet/outlet between the regulator 30 and the reservoir 50. The second inlet/outlet can be filtered. For example, a hydrophobic and/or antimicrobial filter can be positioned in the regulator 30 between the second outlet and the container 10.

In certain embodiments, the adaptor 100 (e.g., a vial adaptor) comprises a piercing member 120, a cap connector 130, a connector interface 140, and a regulator assembly 150. Further details and examples regarding some embodiments of piercing members 120, cap connectors 130, and connector interfaces 140 are provided in U.S. Patent Application Publication No. 2009/0216212, the entirety of each of which is incorporated herein by reference and is made a part of this specification. For clarity, a vial is not illustrated. The adaptor 100 can mate with the vial in a similar manner as illustrated and described in U.S. patent application Ser. No. 14/179,475, filed Feb. 12, 2014, the entirety of which is incorporated herein by reference and is made a part of this specification. For example, when the adaptor 100 is mated with the vial, the piercing member 120 extends through a septum of the vial into the interior of the vial.

In some embodiments, such as in the illustrated embodiment, the cap connector 130 comprises a central portion 132 (that can be curved) and one or more tabs 134 (which can be opposing) attached to the central portion 132. Each of the tabs 134 can be supported at a proximal end of the tab 134 by the central portion 132 of the body portion 380. As shown, the distal end of the tabs 134 can each be unrestrained so as to allow the tab to deflect outward. As used herein the term, "proximal." or any derivative thereof, refers to a direction along the axial length of the piercing member 120 that is toward the connector interface 140; the term "distal," or any derivative thereof, indicates the opposite direction.

The cap connector 130, including the central portion 132 and tabs 134, can help removably secure the vial adaptor 100 to the outside surface of the vial and can help facilitate the removal of the vial adaptor 100 from the vial. In some embodiments, the cap connector 130 comprises only one tab 134, as opposed to a pair of opposing tabs 134, the single tab being configured to removably secure the vial adaptor 300 to the outside surface of the vial and to facilitate the removal of the vial adaptor 100 from the vial. The single tab 134 can be of any suitable configuration, including those set forth herein.

Figure 3:
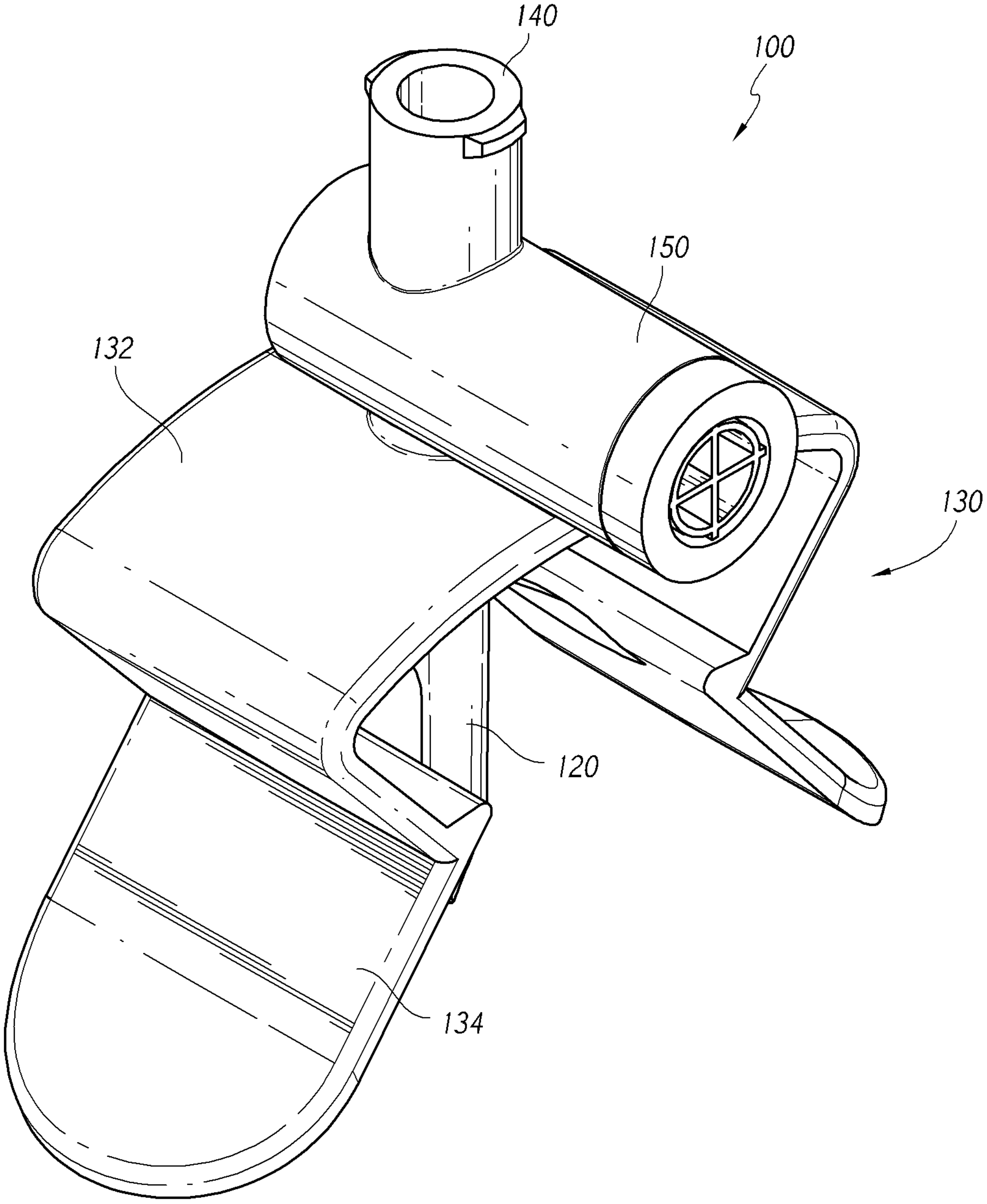
FIG. 3 is a top perspective view of a vial adaptor.
Figure 4:
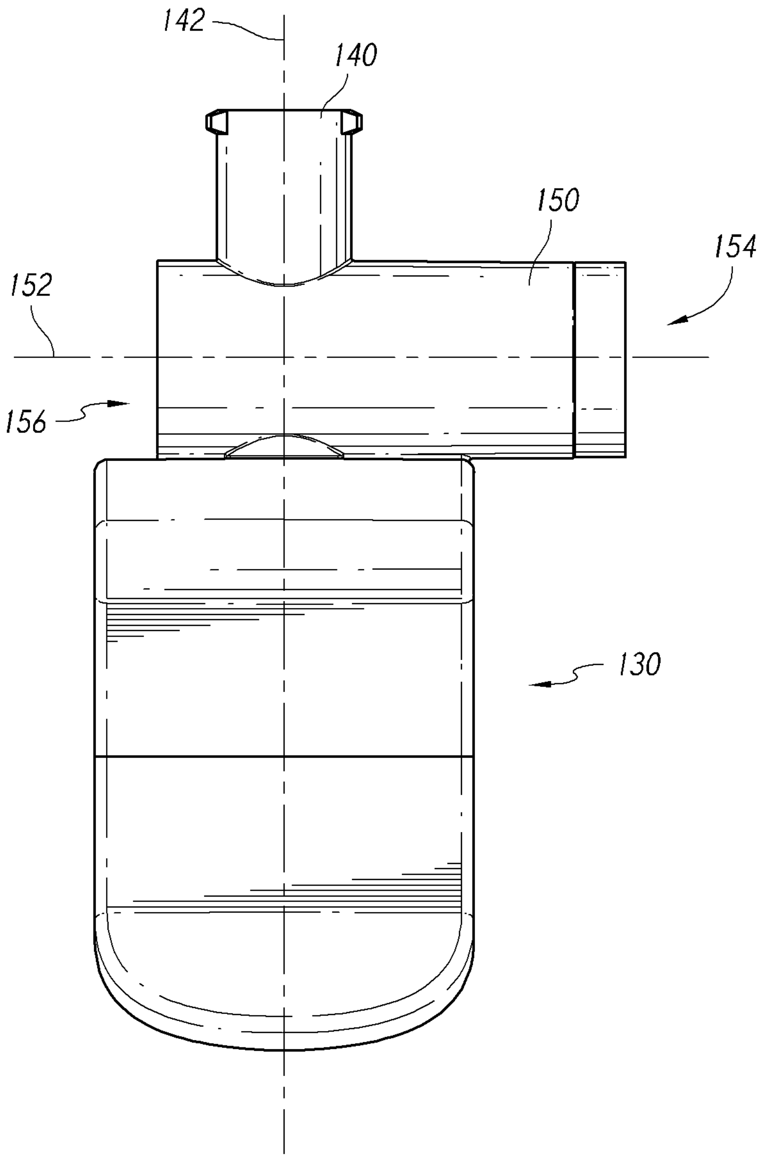
FIG. 4 is a front plan view of the vial adaptor of FIG. 3.
Figure 5:
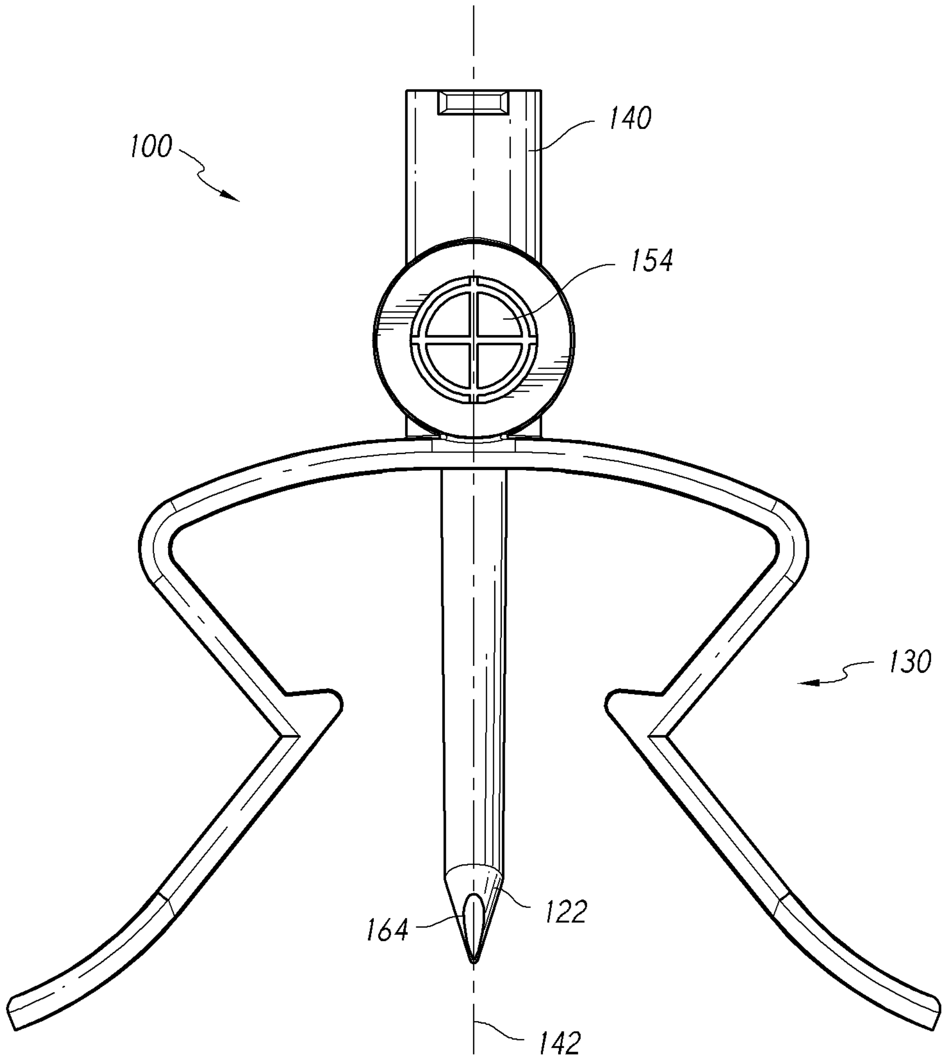
FIG. 5 is a right plan view of the vial adaptor of FIG. 3.
Figure 6:
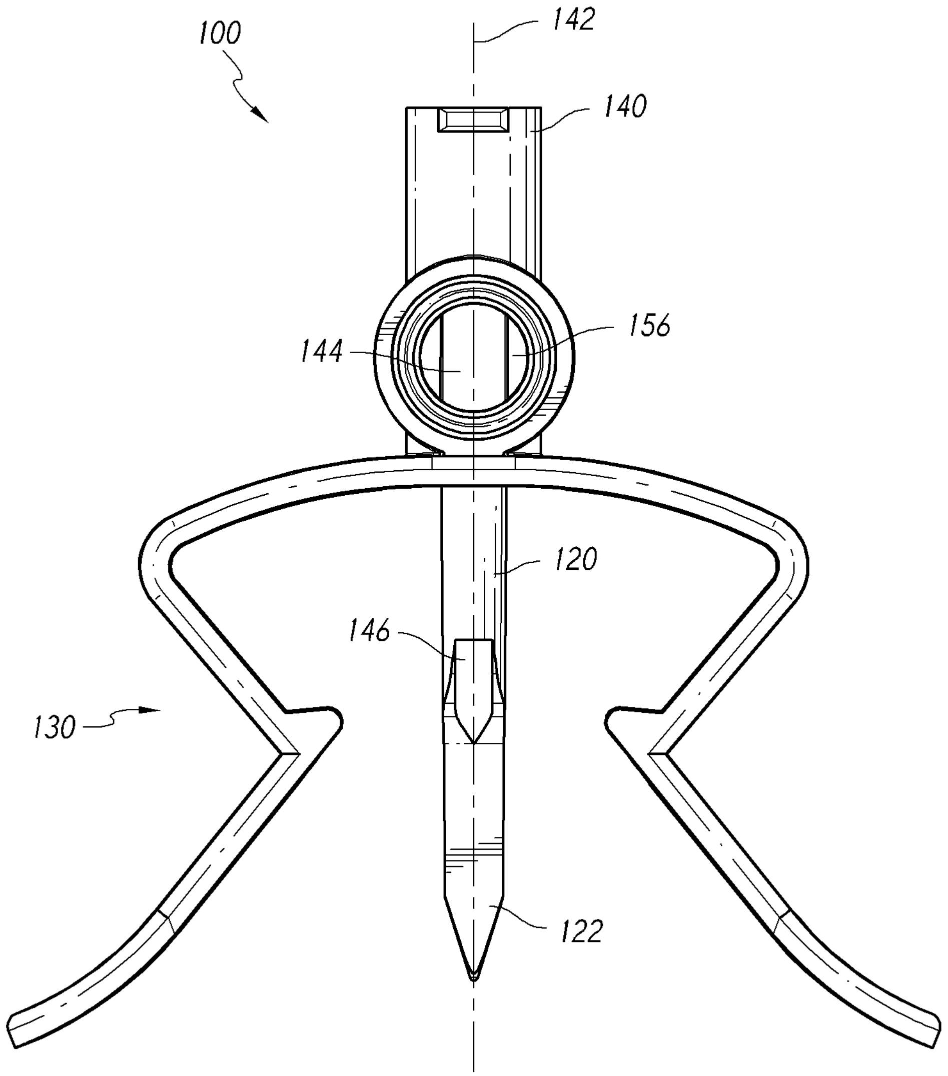
FIG. 6 is a left plan view of the vial adaptor of FIG. 3.

As illustrated in FIGS. 3-5, the connector interface 140 can have an interface centerline 142. The interface centerline 142 can extend substantially through a center of the connector interface 140 generally perpendicular to a proximal opening of the connector interface 140. In some embodiments, the interface centerline 142 extends through a substantial centerline of the piercing member 120. In some embodiments, the interface centerline 142 is perpendicular to the top of a vial to which the vial adaptor 100 is coupled.

As illustrated in FIG. 4, the regulator assembly 150 can include a regulator centerline 152. The regulator centerline 152 can extend substantially through the center of the regulator assembly 150. For example, in some embodiments, the regulator assembly 150 has a generally cylindrical shape, and the regulator centerline 152 extends through a central axis of the cylindrical regulator assembly 150. In some embodiments, the regulator assembly 150 does not have a straight configuration, and the centerline of the regulator assembly 150 is not a straight line. The regulator centerline 152 can be approximately perpendicular to the interface connector 140, as illustrated in FIG. 4. In some embodiments, the regulator centerline 152 extends at an oblique angle to the connector centerline 142. In some embodiments, the regulator centerline 152 intersects the connector centerline 142.

Referring to FIGS. 4 and 5, the regulator assembly 150 can include a first regulator inlet 154. The piercing member 120 can include a piercing tip 122. The piercing tip can be configured to pierce a septum or other seal of a vial to which the vial adaptor 100 is coupled. As illustrated in FIG. 4, the regulator assembly 150 can include a second regulator inlet 156. In some embodiments, a flow inhibitor, such as a valve or a hinged door (not shown), is connected to the second regulator inlet 156. The flow inhibitor can be configured to inhibit or prevent passage of fluids and/or solids into or out from the inlet 156 when the hinged door is in a closed position. In some embodiments, the flow inhibitor can be transitioned to an opened position by a user of the vial adaptor 100. One or more of the first regulator inlet 154 and the second regulator inlet 156 can be positioned along the regulator centerline 152. In some embodiments, both the first and second regulator inlets 154, 156 are positioned substantially collinear with each other. In some cases (not illustrated), the first regulator inlet 154 is positioned at an oblique, or non-collinear, or perpendicular angle with respect to the second regulator inlet 156. In some such cases, both the first and second regulator inlets 154, 156 are positioned on axes generally perpendicular to the interface centerline 142.

Figure 7:
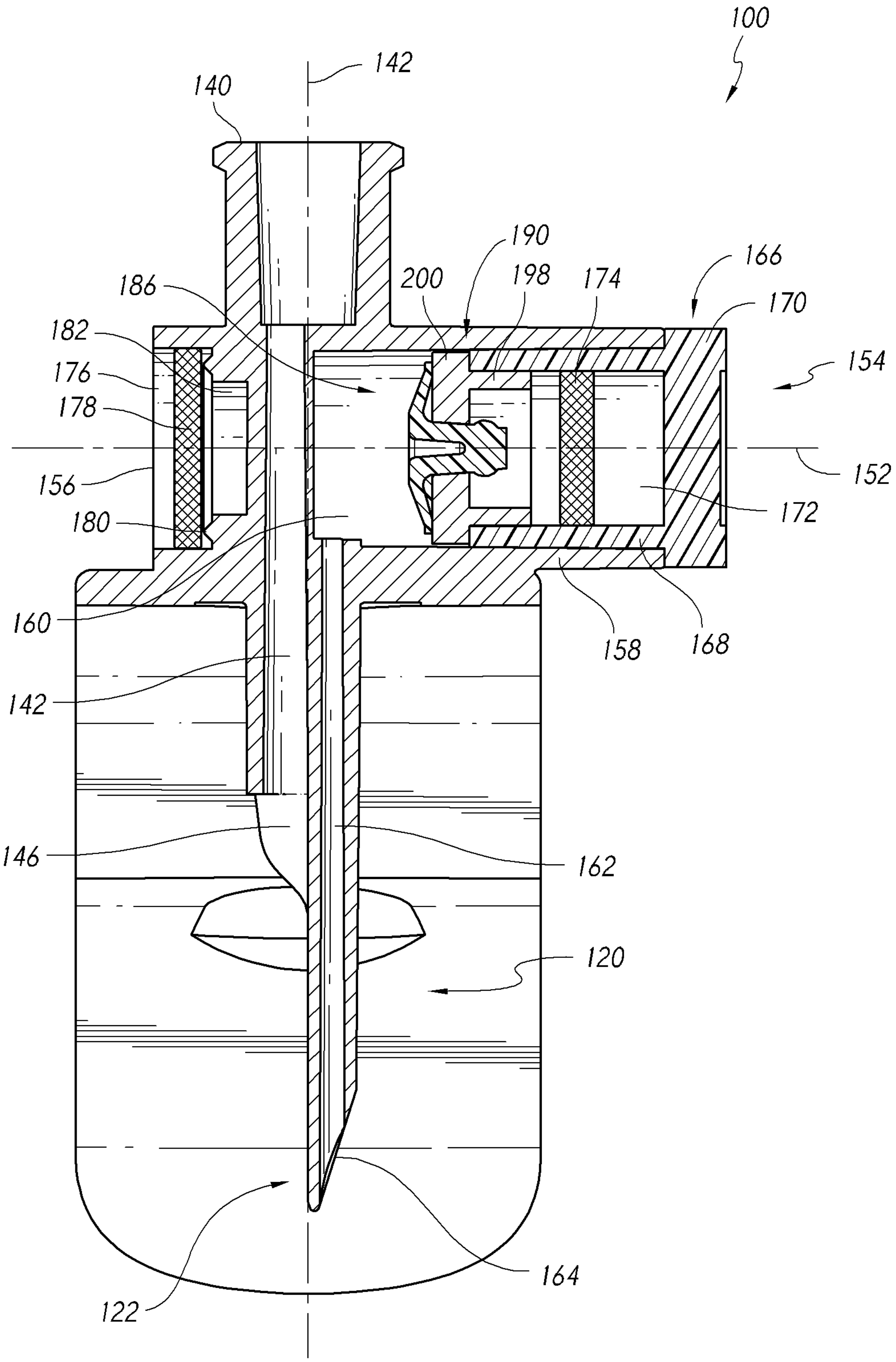
FIG. 7 is a front cross-sectional view of the vial adaptor of FIG. 3.
Figure 8:
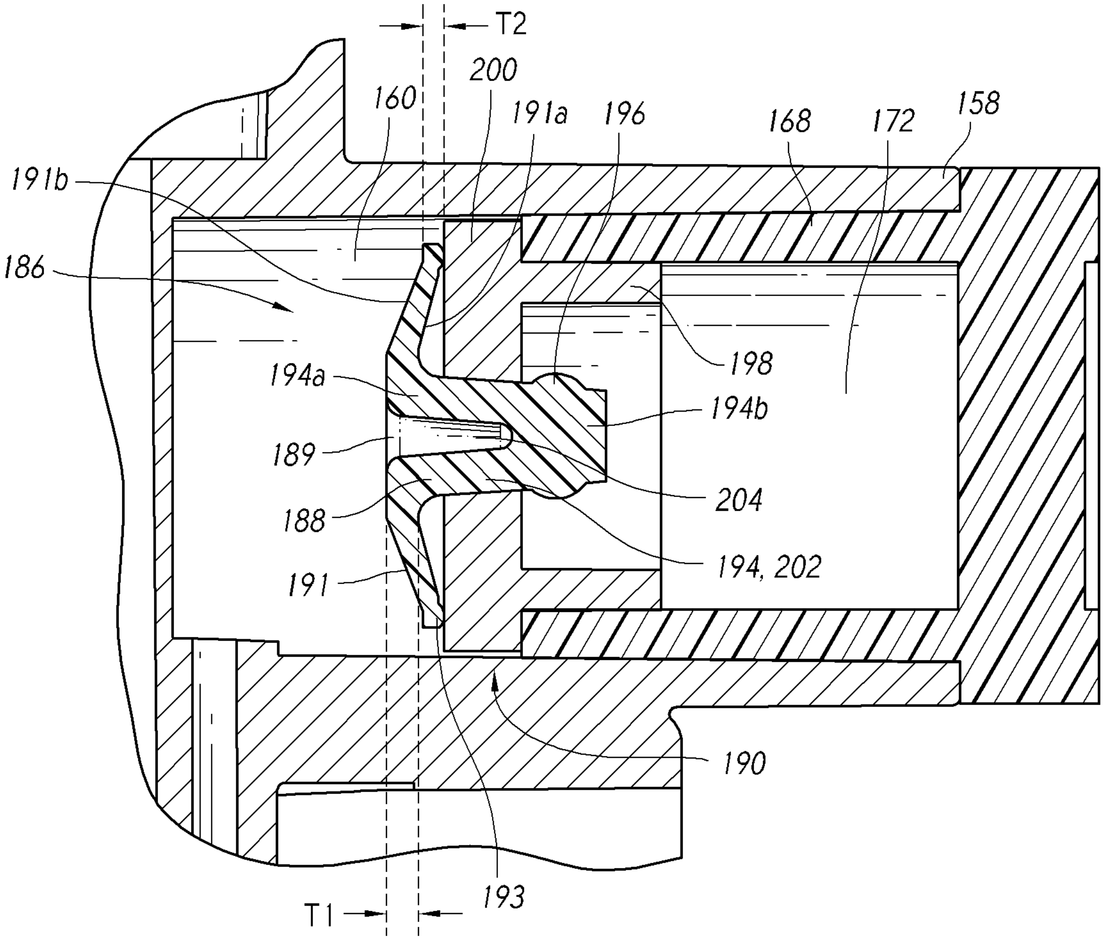
FIG. 8 is a close up front cross-section view of the regulator valve of FIG. 3.

As illustrated in FIG. 7, the connector interface 140 can be in fluid communication with an access channel 142. The access channel 142 can extend into the vial when the vial adaptor 100 is coupled to the vial. In some embodiments, the access channel extends through the regulator assembly 150. The access channel 142 can have an access channel wall 144. The access channel wall 144 can inhibit or prevent fluid communication between the access channel 142 and the regulator assembly 150 (e.g., within the regulator assembly 150). The access channel 142 can extend from a proximal end at the connector interface 140 to a distal access aperture 146, at or near a distal end of the piercing member 120. The access channel 142 can provide fluid communication between a device (e.g., a syringe) coupled to the connector interface 140 and an interior of the vial or other container to which the vial adaptor 100 is coupled.

Referring to FIG. 7, the regulator assembly 150 can include a regulator housing 158. The regulator housing 158 can have a generally cylindrical shape, a generally rectangular shape, or some other shape. In some embodiments, the regulator housing 158 spans the access channel wall 142. In some cases, the regulator housing 158 is positioned only on one side of the access channel wall 142.

The regulator housing 158 can comprise a first regulator lumen 160. In some embodiments, the first regulator lumen 160 extends between the first regulator inlet 154 and the access channel wall 142. As illustrated, the first regulator lumen 160 can be in fluid communication with a regulator channel 162. The regulator channel 162 can extend at least partially through the piercing member 120. For example, the regulator channel 162 can extend between the first regulator lumen 160 and a distal regulator aperture 164. The distal regulator aperture 164 can be positioned at or near the piercing tip 122 of the piercing member 120. In some embodiments, the regulator channel 162 extends substantially parallel to the interface centerline 142.

Figure 9:
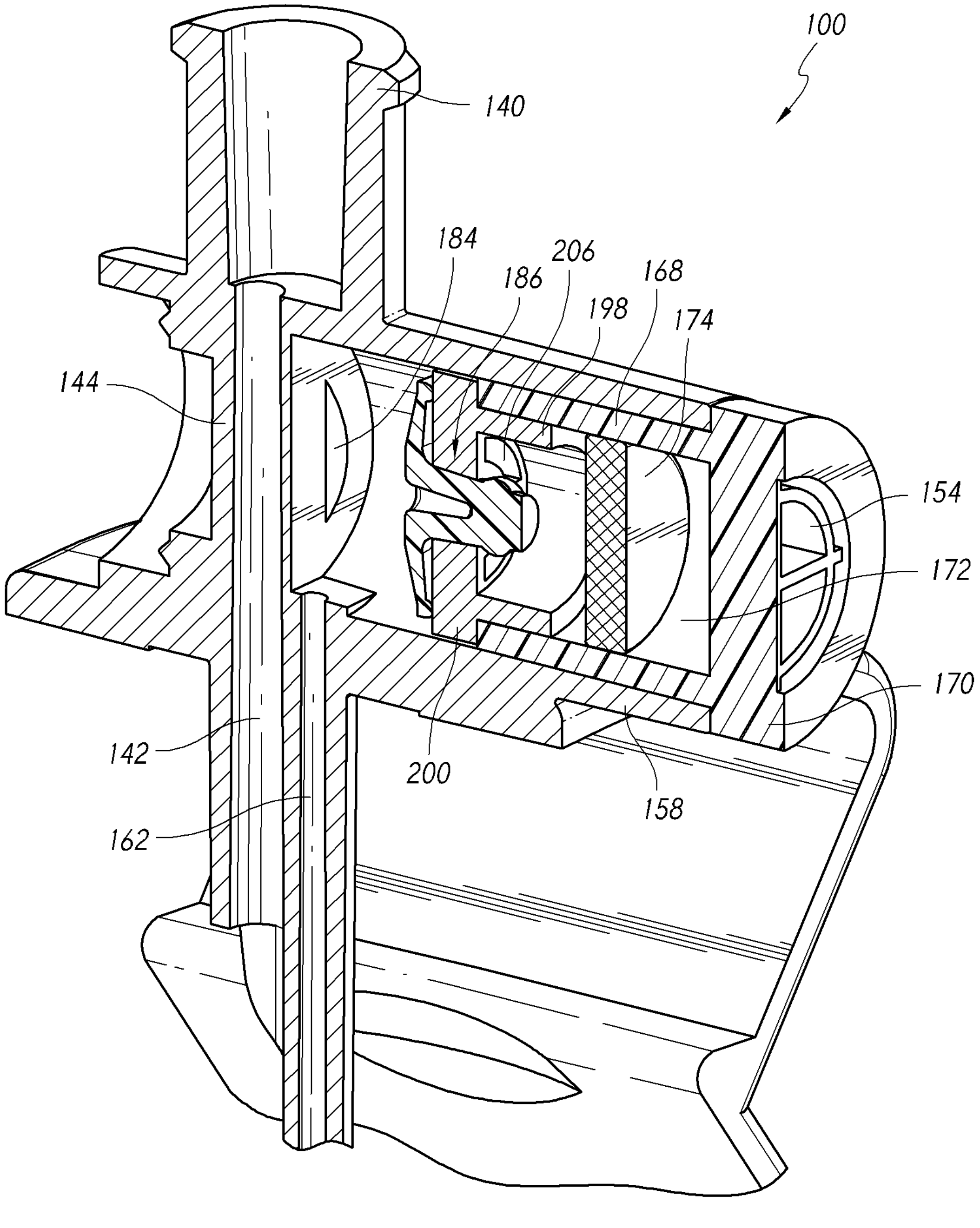
FIG. 9 is a top right perspective cross-section view of the vial adaptor of FIG. 3.
Figure 10:
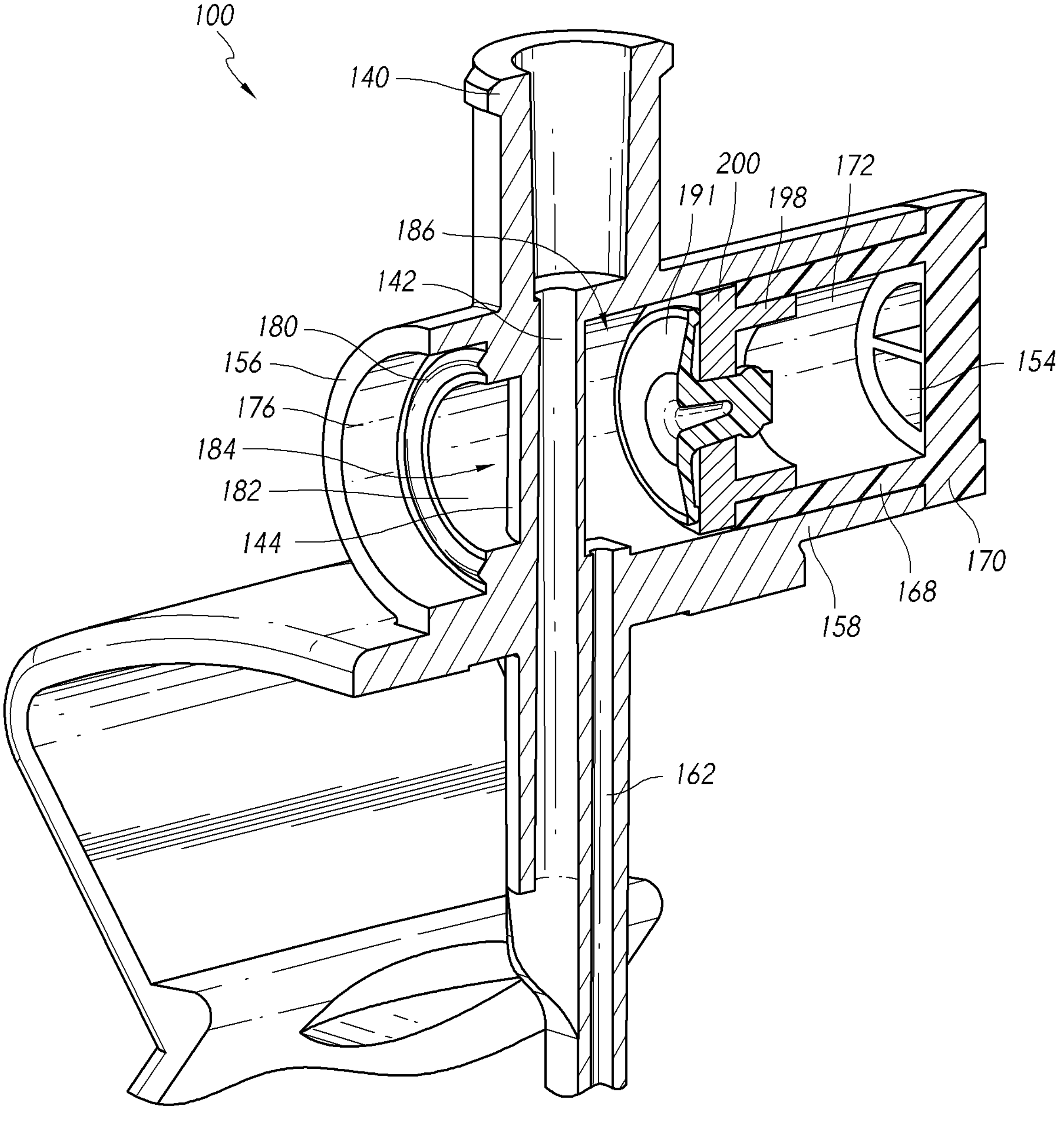
FIG. 10 is a top left perspective cross-section view of the vial adaptor of FIG. 3.

In some embodiments, the regulator housing 158 comprises a second regulator lumen 182. The second regulator lumen 182 can extend between the second regulator inlet 156 and the access channel wall 142. In some cases, the second regulator lumen 182 is in fluid communication with one or more of the first regulator lumen 160 and the regulator channel 162. For example, as illustrated in FIG. 9, the first and second regulator lumens 160, 182 can be connected via a connecting channel 184. In some embodiments, the connecting channel 184 spans the access channel wall 142. As shown in FIG. 7, the first and second regulator lumens 160, 182 and/or the regulator valve 186 can be positioned along a common line that is generally perpendicular to the regulator channel 162.

As illustrated in FIG. 7, a regulator cap 166 can be positioned in or on the first regulator inlet 154. The regulator cap 166 can include a plug portion 168 configured to mate with or otherwise couple with the regulator housing 158. The plug portion 168 can be constructed from a flexible or semi-flexible material. In some embodiments, the plug portion 168 is constructed from a rigid or semi-rigid material. The plug portion 168 can be friction-fit with the regulator housing 158 (such as within the first regulator lumen 160, as illustrated in FIG. 7), adhered thereto, or otherwise fastened to the regulator housing 158. As shown in FIG. 7, the first filter can be positioned in the plug portion 168. The regulator cap 166 can include a cap portion 170. The cap portion 170 can be configured to limit the extent to which the plug portion 168 may be inserted into the regulator housing 158. For example, the cap portion 170 can have a cross-sectional width (e.g., a diameter) greater than the cross-sectional widths of the plug portion 168 and/or of the first regulator lumen 160.

In some embodiments, the plug portion 168 includes a hollow interior. The hollow interior of the plug portion 168 can comprise a first filter chamber 172. The first filter chamber 172 can be configured to receive a first filter 174. The first filter 174 can be adhered to or otherwise affixed to an interior of the plug portion 168 within the filter chamber 172. The filter 174 can inhibit or prevent passage of liquid and/or microbials past the filter 174. For example, the filter 174 can be hydrophobic and/or antimicrobial. In some embodiments, as shown in FIG. 7, the first filter 174 can be capable of fluid communication with the first regulator lumen 160. In some embodiments, the first filter 174 is positioned within the first regulator lumen 160 outside of the hollow interior of the plug portion 168 (e.g., outside of the first filter chamber 172).

As illustrated in FIG. 7, the second regulator inlet 156 can include a second filter chamber 176. The second filter chamber 176 can receive a second filter 178. The second filter 178 can be hydrophobic and/or antimicrobial. In some embodiments, the second filter chamber includes a filter seat 180. The filter seat 180 can be configured to inhibit or prevent accidental adherence of the filter 178 to one or more surfaces of the interior of the first regulator lumen 160. As illustrated, the second filter chamber 176 can be a portion of the second regulator lumen 182. In some embodiments, as shown in FIG. 7, the second filter 178 can be in fluid communication with the second regulator lumen 182.

As illustrated in FIGS. 7-10, the regulator assembly 150 can include a regulator valve 186. As shown in FIG. 7, the regulator valve 186 can be in fluid communication with the interior of the vial adaptor (e.g., with the first regulator lumen 160) and the regulator valve can be configured to permit passage of fluid from the ambient environment into the first regulator lumen. The regulator valve 186 can be configured to inhibit or prevent fluid flow into and/or out of the vial via the regulator channel 162. In some embodiments, as shown in FIG. 7, the regulator valve can be configured to prevent passage of fluid from within the vial to the first filter. In some embodiments, the regulator valve 186 is positioned in a fluid path between the first regulator inlet 154 and the distal regulator aperture 164. In some cases, the regulator valve 186 is positioned in a fluid path between the second regulator inlet 156 and the distal regulator aperture 164. In some embodiments, the regulator valve 186 is positioned at least partially within the regulator channel 162. In some cases, all or a portion of the regulator valve 186 is positioned within the first regulator lumen 160. The regulator valve 186 can be configured to transition between an opened configuration and a closed configuration. In some cases, the regulator valve 186 permits fluid flow in one or more directions between the distal regulator aperture 164 and the first and/or second regulator inlets 154, 156 when the regulator valve 186 is in the opened configuration. For example, the regulator valve 186 can be positioned and configured to operate as a one-way valve to permit fluid flow from the first regulator inlet 154 to the distal regulator aperture 164, but not from the distal regulator aperture 164 to the first regulator inlet 154, when the regulator valve 186 is in the opened configuration. In some embodiments, the regulator valve 186 inhibits or prevents fluid flow past the regulator valve 186 when the regulator valve 186 is in the closed configuration.

The regulator valve 186 can include a valve body 188. The valve body 188 can be configured to releasably mate with or fixedly mate with a valve seat 190. In some embodiments, at least a portion of the valve body 188 comprises an elastomeric, resilient, and/or flexible material. For example, the valve body 188 can be injection molded using an elastomeric material.

The valve body 188 can include a flap portion 191. The flap portion 191 can have a concave side 191*a* and a convex side 191*b*. In some embodiments, the flap portion 191 can have a generally circular shape, rectangular shape, oval shape, or other suitable shape. The flap portion 191 can extend outward from (e.g., radially outward with respect to the regulator centerline 152) a hub portion 189 of the valve body 186. In some embodiments, the flap portion includes a lip portion 193. The lip portion 193 can be positioned at or near a periphery of the flap portion 191.

In some embodiments, as shown, the flap portion 191 can be configured to produce a restoring force when the flap portion 191 is temporarily moved away from its natural concave or convex configurations (e.g., such as when the flap portion 191 is caused to become substantially flat, or less concave or less convex than in its natural position, or to essentially reverse its natural concave or convex sides) to bias the flap portion 191 back to its original shape and/or orientation. In some embodiments of this configuration, the flap portion 191 can temporarily permit the passage of fluid flow that exceeds a threshold pressure from the concave side of the flap portion 191 toward the convex side of the flap portion 191, but the flat portion 191 can resist, impede, or prevent the passage of fluid flow from the convex side of the flap portion 191 toward the concave side of the flap portion, even at extremely high pressure within the context of a vascular medical product.

In some embodiments, the valve seat 190 includes a valve stem 194. The valve stem 194 can have a first end 194*a* and a second end 194*b*. The valve stem 194 can extend from the flap portion 191 (e.g., from the concave side 191*a* of the flap portion 191). For example, the first end 194*a* can be connected to the hub portion 189 of the valve body 188 and the second end 194*b* of the valve body 188 can be spaced from the hub portion 189. The valve stem 194 can include a valve anchor 196. The valve anchor 196 can be, for example, one or more protrusions (e.g., an annular protrusion) or other features configured to inhibit accidental de-coupling between the valve body 188 and the valve seat 190. In some embodiments, the valve anchor 196 is positioned at or near the second end 194*b* of the valve stem 194.

In some cases, the valve seat 190 is formed as a portion of the regulator cap 166. As illustrated in FIGS. 7-10, the valve seat 190 can comprises a separate component configured to mate with or otherwise connect with the regulator cap 166. For example, the valve seat 190 can include a mating portion 198. The mating portion 198 can be configured to mate with the plug portion 168 of the regulator cap 166. In some embodiments, an outer cross-section of the mating portion 198 can be sized and shaped to substantially match an inner cross-section of the plug portion 168. In some embodiments, the mating portion 198 of the valve seat 190 is friction-fit to the plug portion 168. In some embodiments, adhesives or other mating materials are used to mate the mating portion 198 to the plug portion 168. The valve seat 190 can include a stop portion 200. The stop portion 200 can be configured to limit the extent to which the mating portion 198 is inserted into or over the plug portion 168. For example, the stop portion 200 can have a larger cross-sectional area than the mating portion 198.

The stop portion 200 or some other portion of the valve seat 190 or of the regulator cap 166 can include a seat aperture 202. The seat aperture 202 can have a cross-sectional shape configured to receive at least a portion of the valve stem 194. The stop portion 200 can have a thickness (e.g., as measured substantially parallel to the regulator centerline 152 in FIG. 7) such that the valve stem 194 and/or other portions of the valve body 188 are elastically deformed when the valve stem 194 is mated with the seat aperture 202. For example, the thickness of the stop portion 200 can be greater than a distance between the valve anchor 196 and the lip portion 193 of the valve body 188 when the valve body 188 is in a non-deformed configuration. In some embodiments, the lip portion 193 of the valve body 188 is deflected away from the valve anchor 196 when the valve stem 194 is mated with the seat aperture 202. Deflection of the lip portion 193 away from the valve anchor 196 can bias the lip portion 193 toward the stop portion 200. Contact between the lip portion 193 and the stop portion 200 of the valve seat 190 can form a seal to inhibit or prevent fluid flow through the valve seat 190 past the flap portion 191 of the valve body 188. In some embodiments, deflection of the lip portion 193 away from the valve anchor 196 can bias the regulator valve 186 to the closed configuration.

In some embodiments, the valve stem 194 includes a flexibility-increasing feature. For example, the valve stem 194 can include a cored portion 204. The cored portion 204 can increase the compressibility of the valve stem 194. In some embodiments, the cored portion 204 can increase a sealing force between the valve stem 194 and the seat aperture 202. For example, the cored portion 204 can facilitate insertion of a valve stem 194 having a larger width (e.g., diameter) than would otherwise be capable of insertion into the seat aperture 202.

As illustrated in FIG. 9, the valve seat 190 (e.g., the cap portion 200 of the valve seat 190) can include one or more valve channels 206. The valve channels 206 can facilitate fluid communication between the first regulator inlet 154 and the regulator valve 186. For example, the one or more valve channels 206 can facilitate fluid communication between the filter chamber 172 and the flap portion 191 of the regulator valve 186. In some embodiments, each of the one or more valve channels 206 is positioned within the periphery of the flap portion 191 of the regulator valve 186 (e.g., radially inside of the contact area between the lip portion 193 and the stop portion 200). In some embodiments, space between the valve stem 194 and the seat aperture can facilitate fluid communication between the filter chamber 172 and the flap portion 191 of the regulator valve 186.

The regulator assembly 150 can be configured to regulate pressure within the vial when compounds (e.g., liquids, gases, and/or solids) are introduced into or withdrawn from the vial. For example, introduction of a compound into the vial via the access channel 142 can increase the pressure within the vial. The regulator assembly 150 can be configured to release at least a portion of the excess pressure (e.g., the pressure above ambient pressure) by, for example, releasing gas from the vial through the second regulator inlet 156 via the regulator channel 162. As shown in FIG. 7, the second filter 178 can be configured to filter fluid passing from the second regulator lumen 182 into the ambient environment.

In some cases, the regulator assembly 150 can be configured to relieve pressure deficits within the vial. For example, withdrawing compounds from the vial via the access channel 142 can decrease the pressure within the vial. Decreased pressure within the vial can create a vacuum in the first regulator lumen 160 and/or in the second regulator lumen 176. The regulator assembly 150 can be configured to introduce ambient air (e.g., filtered ambient air) into the vial when a vacuum is created in the first and/or second regulator lumens 160, 176. For example, the regulator assembly 130 can draw ambient air into the vial via the second regulator inlet 156, through second filter 178, and/or through the regulator channel 162. In some cases (e.g., when the second regulator inlet 156 is partially or fully blocked or clogged), creation of a vacuum in the first regulator lumen 160 between the regulator valve 186 and the regulator channel 162 can create a pressure differential across the flap portion 191 of the regulator valve 186. For example, the pressure on the side of the flap portion 191 in communication with the first regulator inlet 154 can be approximately ambient pressure while the pressure on the side of the flap portion 191 in communication with the regulator channel 162 can be below ambient pressure. The regulator valve 186 can be configured to release the seal between the lip portion 193 of the flap portion 191 and the stop portion 200 of the valve seat 190 when the pressure differential across the flap portion 191 exceeds a threshold value (e.g., a cracking pressure). In some cases, the cracking pressure of the flap portion 191 can be greater than or equal to about 0.1 psi and/or less than or equal to about 5 psi. Release of the seal between the lip portion 193 of the flap portion 191 and the stop portion 200 of the valve seat 190 can transition the regulator valve 186 to an opened configuration. Transitioning the regulator valve 186 to the opened configuration can permit passage of air (e.g., filtered air) from the ambient surroundings into the vial. Introducing air from the ambient surroundings into the vial can increase the pressure within the vial and can reduce the pressure differential across the flap portion 191 of the regulator valve 186. Many variations are possible.

In some embodiments, the regulator valve 186 is configured to operate independent of the orientation of the valve adaptor 100. For example, the regulator valve 186 can be configured to operate in substantially the same manner whether the connector interface 140 is oriented above or below the piercing tip 122 of the piercing member 120. In some embodiments, the regulator valve 186 is configured to inhibit or prevent wetting of the first filter 174 from liquid within the vial. As explained above, the regulator valve 186 can operate as a one-way valve to permit fluid passage from the first regulator inlet 154 to the vial when the cracking pressure on the flap portion 191 of the regulator valve 186 is reached. Maintaining the first filter 174 in a dry condition can permit use of a small (e.g., small diameter) filter in the first filter chamber 172.

Figure 11:
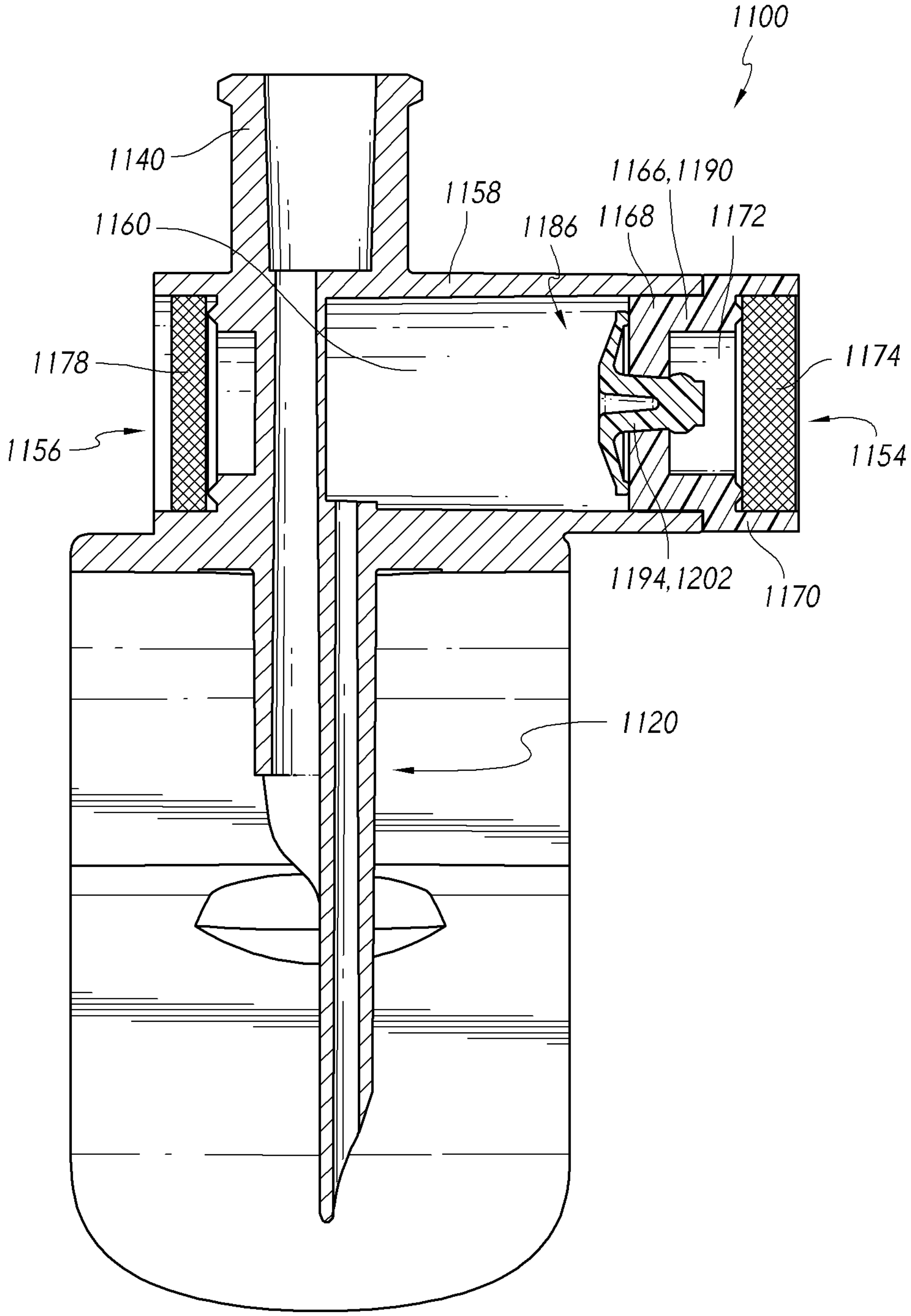
FIG. 11 is a front cross-sectional view of another embodiment of a vial adaptor.

FIG. 11 illustrates an embodiment of a vial adaptor 1100 that can have any components or portions of any other vial adaptors disclosed herein. In some embodiments, the vial adaptor 1100 includes a connector interface 1140 and a piercing member 1120 in partial communication with the connector interface 1140. In some embodiments, the vial adaptor 1100 includes a regulator assembly 1150. As illustrated, the vial adaptor 1100 can be configured to regulate pressure within vial introduction of compounds to and/or withdrawal of compounds from the vial. Some numerical references to components in FIG. 11 are the same as or similar to those previously described for the vial adaptor 100 (e.g., piercing member 1120 v. piercing member 120). It is to be understood that the components can be the same in function or are similar in function to previously-described components. The adaptor 1100 of FIG. 11 shows certain variations to the adaptor 100 of FIGS. 1-10. As illustrated in FIG. 11, the regulator cap 1166 and valve seat 190 can form a unitary component. In some cases, the valve seat aperture 1200 can be positioned on the plug portion 1168 of the regulator cap 1166.

As illustrated in the figures of this application, including in FIG. 7, a pressure-regulating vial adaptor can be manufactured using any suitable manufacturing process that provides any or all of the components that are illustrated and/or described in this specification, either alone or in combination with one or more other components that are illustrated and/or described in this specification.

For expository purposes, the term "horizontal" as used herein is defined as a plane parallel to the plane or surface of the floor of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top." "side," "higher," "lower," "upper," "over," and "under," are defined with respect to the horizontal plane.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

Although the vial adaptor has been disclosed in the context of certain embodiments and examples, it will be understood by those skilled in the art that the vial adaptor extends beyond the specifically disclosed embodiments to other alternative embodiments and/or uses of the embodiments and certain modifications and equivalents thereof. For example, some embodiments do not include a second regulator inlet 156 and, instead, regulate pressure within the vial via the first regulator inlet 154. Accordingly, it is intended that the scope of the vial adaptor herein-disclosed should not be limited by the particular disclosed embodiments described above, but should be determined only by a fair reading of the claims that follow.

The following is claimed:

1. An adaptor configured to couple with a sealed vial, the adaptor comprising:

a connector interface;

an access channel in fluid communication with the connector interface;

a regulator assembly comprising:

a regulator inlet in fluid communication with an ambient environment surrounding the adaptor;

a regulator lumen;

a plug portion sized and shaped to be inserted into the regulator lumen;

an anchor sized and shaped to limit an extent to which the plug portion is inserted into the regulator lumen;

a mating portion configured to engage at least a portion of the regulator assembly and connect the plug portion to at least a part of the regulator assembly;

a regulator cap positioned at the regulator inlet, the regulator cap having an aperture;

a filter capable of fluid communication with the regulator lumen and configured to filter fluid passing into the regulator lumen, the filter being configured to inhibit passage of at least one of liquid or microbials past the filter; and a regulator valve positioned within the plug portion, the regulator valve configured to permit passage of fluid through the regulator valve from the ambient environment into the regulator lumen, the regulator valve further configured to resist passage of fluid through the regulator valve from the regulator lumen towards the ambient environment such that the regulator valve is configured to inhibit liquid within the sealed vial from passing through the regulator valve, the regulator valve having a cracking pressure greater than or equal to 0.1 psi and less than or equal to 5 psi;

a piercing member comprising a proximal end and a distal end, the distal end comprising a piercing tip; and a regulator channel positioned at least partially within the piercing member and comprising a regulator channel opening in fluid communication with the regulator lumen.

2. The adaptor of claim 1, wherein the regulator valve comprises a circular shape.

3. The adaptor of claim 1, wherein the regulator valve comprises a convex side and a concave side when the regulator valve is in a resting orientation.

4. The adaptor of claim 3, wherein the convex side is located opposite the concave side of the regulator valve.

5. The adaptor of claim 1, wherein the filter is hydrophobic.

6. The adaptor of claim 1, wherein the filter is antimicrobial.

7. The combination of the adaptor of claim 1 and the sealed vial.

8. The adaptor of claim 1, wherein the regulator valve comprises a valve stem and a flap portion.

9. The adaptor of claim 1 further comprising a valve seat being configured to releasably couple with the regulator valve.

10. The adaptor of claim 9, wherein the regulator valve comprises a valve anchor configured to inhibit decoupling of the regulator valve and the valve seat.

11. The adaptor of claim 10, wherein the valve anchor comprises one or more protrusions.

12. The adaptor of claim 1, wherein the anchor comprises a cross-sectional width that is larger than a cross-sectional width of the plug portion.

13. The adaptor of claim 1, wherein the plug portion is retained within the regulator lumen by a friction fit.

14. The adaptor of claim 1, wherein the filter is positioned between the regulator valve and the regulator inlet.

15. The adaptor of claim 1, wherein the regulator inlet is configured to be at least partially blocked.

16. The adaptor of claim 1, further comprising a flow inhibitor configured to prevent passage of fluids into the regulator inlet.

17. The adaptor of claim 1, wherein the mating portion is configured to mate with the regulator cap.

18. The adaptor of claim 1, wherein the mating portion comprises an annular protrusion.

19. The adaptor of claim 1, further comprising a valve seat configured to support the regulator valve and connect the regulator valve to the plug portion.

20. The adaptor of claim 1, wherein the plug portion is configured to mate with the regulator lumen.

* * * * *